US012490712B2

(12) United States Patent
Tindal et al.

(10) Patent No.: US 12,490,712 B2
(45) Date of Patent: Dec. 9, 2025

(54) SENSING AND INTEGRATING DATA OF ENVIRONMENTAL CONDITIONS IN ANIMAL RESEARCH

(71) Applicant: THE UAB RESEARCH FOUNDATION, Birmingham, AL (US)

(72) Inventors: Robert J. Tindal, Birmingham, AL (US); Erik Dohm, Trussville, AL (US); Sam Misko, Birmingham, AL (US); Samuel Cartner, Birmingham, AL (US); Jaret Langston, Hoover, AL (US); Pam Bounelis, Mountain Brook, AL (US); Rachana Kotapalli, Alpharetta, GA (US); Emma Latham Godwin, Quinton, AL (US)

(73) Assignee: THE UAB RESEARCH FOUNDATION, Birmingham, AL (US)

( * ) Notice: Subject to any disclaimer, the term of this patent is extended or adjusted under 35 U.S.C. 154(b) by 311 days.

(21) Appl. No.: 17/431,960

(22) PCT Filed: Mar. 20, 2020

(86) PCT No.: PCT/US2020/023906
§ 371 (c)(1),
(2) Date: Aug. 18, 2021

(87) PCT Pub. No.: WO2020/191312
PCT Pub. Date: Sep. 24, 2020

(65) Prior Publication Data
US 2022/0117191 A1    Apr. 21, 2022

Related U.S. Application Data

(60) Provisional application No. 62/821,096, filed on Mar. 20, 2019.

(51) Int. Cl.
*A01K 1/03* (2006.01)
*H04L 67/12* (2022.01)
(Continued)

(52) U.S. Cl.
CPC ............. *A01K 1/031* (2013.01); *H04R 1/406* (2013.01); *H04R 3/005* (2013.01); *H04L 67/12* (2013.01)

(58) Field of Classification Search
CPC ...... A01K 1/031; A01K 29/005; H04R 1/406; H04R 3/005; H04L 67/12
See application file for complete search history.

(56) References Cited

U.S. PATENT DOCUMENTS 10,064,392 B1    9/2018  Betts-Lacroix
10,089,435 B1 *  10/2018  Betts-Lacroix ........ G16B 20/00
(Continued)

FOREIGN PATENT DOCUMENTS

NO    2014037890 A2    3/2014
WO    WO-0065905 A1 *  11/2000  ............. A01K 1/031
(Continued)

OTHER PUBLICATIONS

Search Report, issued by European Patent Office, EP Patent Application No. 20774344.4, mailed Mar. 20, 2023.
(Continued)

*Primary Examiner* — Kimberly S Berona
*Assistant Examiner* — Katherine June Walter
(74) *Attorney, Agent, or Firm* — Thomas | Horstemeyer, LLP

(57) ABSTRACT

Disclosed are various embodiments for sensing and integrating data of environmental conditions in animal research. A collection device having a bracket is removably mounted to a cage. The collection device includes a sensor array that captures audio content or environmental measurements. A
(Continued)

micro-environment monitor of the collection device can process the audio content to determine that audible or ultrasonic vocalizations of an animal are present. The micro-environment monitor sends data based at least in part on the audio content or environmental measurements to a computing environment.

20 Claims, 17 Drawing Sheets

(51) Int. Cl.
  *H04R 1/40* (2006.01)
  *H04R 3/00* (2006.01)

(56) References Cited

U.S. PATENT DOCUMENTS

| | | | | |
|---|---|---|---|---|
| 10,244,338 | B2* | 3/2019 | Namba | G10L 25/51 |
| 2009/0126640 | A1* | 5/2009 | Ulman | A01K 5/0275 |
| | | | | 340/573.3 |
| 2012/0085291 | A1* | 4/2012 | Conger | A01K 1/0047 |
| | | | | 119/419 |
| 2015/0004679 | A1* | 1/2015 | Conger | A01K 1/031 |
| | | | | 435/287.2 |
| 2019/0042692 | A1 | 2/2019 | Betts-Lacroix et al. | |
| 2020/0315141 | A1* | 10/2020 | Kusui | G06V 10/803 |
| 2020/0337272 | A1* | 10/2020 | Kumar | G06V 10/772 |
| 2021/0065277 | A1* | 3/2021 | Bramson | G06Q 30/0631 |
| 2022/0028413 | A1* | 1/2022 | Linton | A01K 29/005 |

FOREIGN PATENT DOCUMENTS

| | | | | |
|---|---|---|---|---|
| WO | WO-2018039366 A1 * | 3/2018 | | A01K 1/031 |
| WO | 2019/032622 A1 | 2/2019 | | |

OTHER PUBLICATIONS

International Search Report issued for PCT/US2020/023906, mailed Jun. 30, 2020.

* cited by examiner

SENSING AND INTEGRATING DATA OF ENVIRONMENTAL CONDITIONS IN ANIMAL RESEARCH

CROSS-REFERENCE TO RELATED APPLICATION

This application is a 35 U.S.C. § 371 National Stage Patent Application of Patent Cooperation Treaty Application number PCT/US2020/023906, filed Mar. 20, 2020, which claims priority to and the benefit of U.S. Provisional Application No. 62/821,096, filed on Mar. 20, 2019, entitled "Sensing and Integrating Data of Environmental Conditions in Animal Research," the entire contents of both of which applications are hereby incorporated herein by reference.

GOVERNMENT LICENSE RIGHTS

This invention was made with government support under R41OD026185 awarded by the National Institutes of Health. The Government has certain rights in the invention.

BACKGROUND

Research animal models are important to researchers. According to People for the Ethical Treatment of Animals (PETA), over 100 million rodents are used annually in research labs. Monitoring those animals—housed no more than 5 to a cage—can be difficult and costly. Additionally, losing research animals that are in an active study can be much more costly in terms of outcomes of the study. At present, quality census, daily checks, and ensuring controls affecting outcomes is a constant struggle.

Conventional techniques for conducting census to count the animals and note the presence of new baby animals requires the use of a large number of technicians. Conventional techniques can be costly and fail to address negative effects from animal deaths. Therefore, there is a need for systems and methods that can provide cage-level monitoring and address animal welfare issues in animal research laboratories.

SUMMARY

According to one embodiment, a collection device is provided that includes a sensor array and a micro-environment monitor. The sensor array is configured to sense a micro-environment of a cage. The micro-environment monitor includes a network interface, at least one processor, and program instructions stored in memory and executable by the at least one processor that, when executed, cause the micro-environment monitor to send data to a computing environment using the network interface. The data is based at least in part on at least one of: audio content captured by the sensor array, or a measurement provided by the sensor array.

In another embodiment, a system is provided that includes a sensor array with sensors. A first one of the sensors is configured to capture audio content corresponding to audible or ultrasonic vocalizations of a rodent in a cage. The system also provides a micro-environment monitor that includes a network interface, at least one processor, and program instructions stored in memory and executable by the at least one processor that, when executed, cause the micro-environment monitor to send a status message concerning the rodent in the cage to a computing environment with the network interface.

In another embodiment, a method is provided that includes monitoring a cage with a sensor array having sensors. A first one of the sensors is configured to capture audio content comprising audible or ultrasonic vocalizations of an animal in the cage. The method includes sending a status message concerning the animal to a computing environment on an intermittent basis.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

In addition, all optional and preferred features and modifications of the described embodiments are usable in all aspects of the entire disclosure taught herein. Furthermore, the individual features of the dependent claims, as well as all optional and preferred features and modifications of the described embodiments are combinable and interchangeable with one another.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

Figure 1:
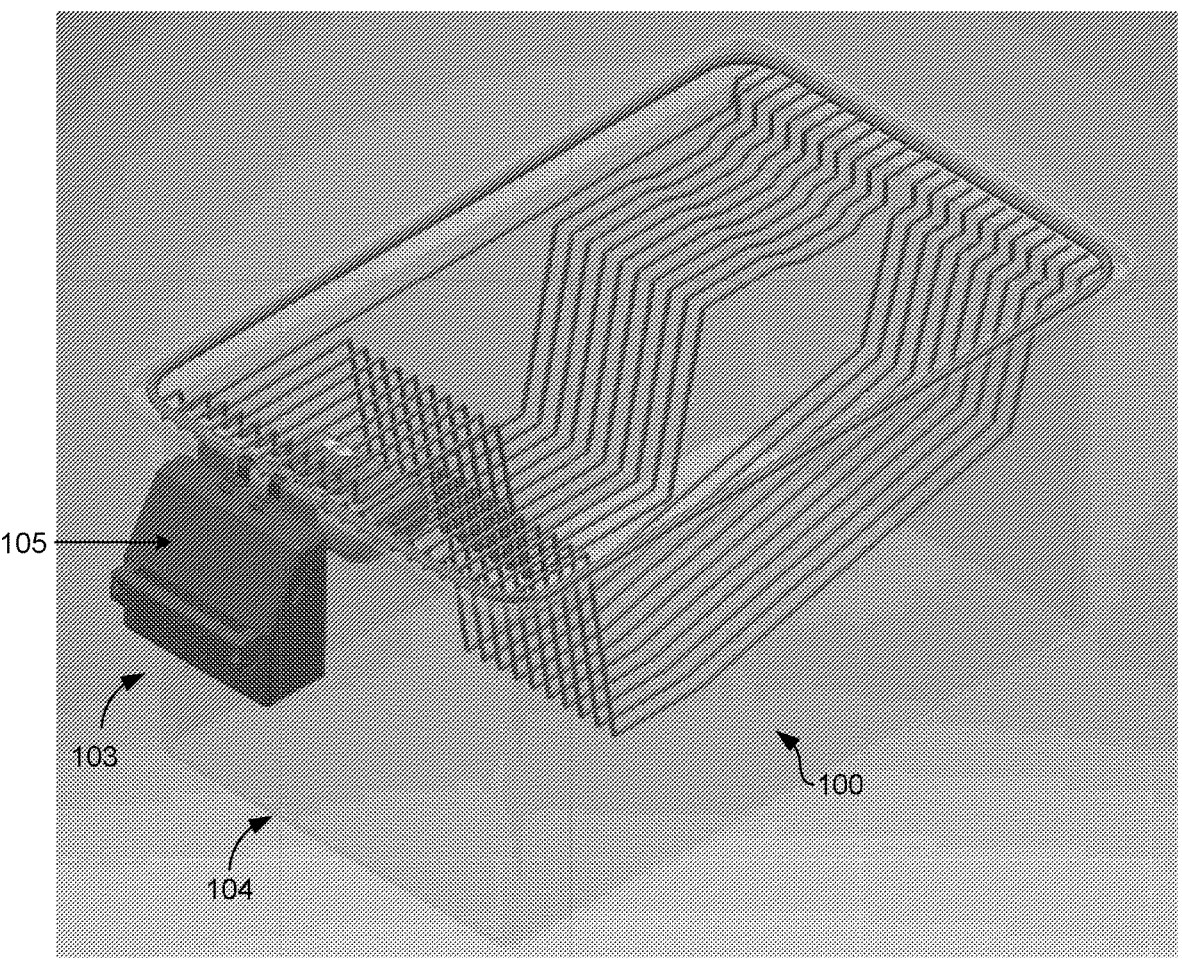
FIG. 1 is an example of a collection device according to various embodiments of the present disclosure.

The drawings illustrate only example embodiments and are therefore not to be considered limiting of the scope described herein, as other equally effective embodiments are within the scope and spirit of this disclosure. The elements and features shown in the drawings are not necessarily drawn to scale, emphasis instead being placed upon clearly illustrating the principles of the embodiments. Additionally, certain dimensions may be exaggerated to help visually convey certain principles. In the drawings, similar reference numerals between figures designate like or corresponding, but not necessarily the same, elements.

DETAILED DESCRIPTION

In the following detailed description, for purposes of explanation and not limitation, exemplary, or representative, embodiments disclosing specific details are set forth in order to provide a thorough understanding of inventive principles and concepts. However, it will be apparent to one of ordinary skill in the art having the benefit of the present disclosure that other embodiments according to the present teachings that are not explicitly described or shown herein are within the scope of the appended claims. Moreover, descriptions of well-known apparatuses and methods may be omitted so as not to obscure the description of the exemplary embodiments. Such methods and apparatuses are clearly within the scope of the present teachings, as will be understood by those of skill in the art. It should also be understood that the word "example," as used herein, is intended to be non-exclusionary and non-limiting in nature.

The terminology used herein is for purposes of describing particular embodiments only, and is not intended to be limiting. The defined terms are in addition to the technical, scientific, or ordinary meanings of the defined terms as commonly understood and accepted in the relevant context.

The terms "a," "an" and "the" include both singular and plural referents, unless the context clearly dictates otherwise. Thus, for example, "a device" includes one device and plural devices. The terms "substantial" or "substantially" mean to within acceptable limits or degrees acceptable to those of skill in the art. For example, the term "substantially parallel to" means that a structure or device may not be made perfectly parallel to some other structure or device due to tolerances or imperfections in the process by which the structures or devices are made. The term "approximately" means to within an acceptable limit or amount to one of ordinary skill in the art. Relative terms, such as "over," "above," "below," "top," "bottom," "upper" and "lower" may be used to describe the various elements' relationships to one another, as illustrated in the accompanying drawings. These relative terms are intended to encompass different orientations of the device and/or elements in addition to the orientation depicted in the drawings. For example, if the device were inverted with respect to the view in the drawings, an element described as "above" another element, for example, would now be below that element.

Relative terms may be used to describe the various elements' relationships to one another, as illustrated in the accompanying drawings. These relative terms are intended to encompass different orientations of the device and/or elements in addition to the orientation depicted in the drawings.

The term "memory" or "memory device", as those terms are used herein, are intended to denote a non-transitory computer-readable storage medium that is capable of storing computer instructions, or computer code, for execution by one or more processors. References herein to "memory" or "memory device" should be interpreted as one or more memories or memory devices. The memory may, for example, be multiple memories within the same computer system. The memory may also be multiple memories distributed amongst multiple computer systems or computing devices.

A "processor," "hardware processor," "processing device," or "processing logic," as those terms are used herein encompass an electronic component that is able to execute a computer program or executable computer instructions. References herein to a system comprising "a processor," "a processing device," or processing logic should be interpreted as a system having one or more processors or processing cores. The processor may for instance be a multi-core processor. A processor may also refer to a collection of processors within a single computer system or distributed amongst multiple computer systems. The term "computer," as that term is used herein, should be interpreted as possibly referring to a single computer or computing device or to a collection or network of computers or computing devices, each comprising a processor or processors. Instructions of a computer program can be performed by a single computer or processor or by multiple processors that may be within the same computer or that may be distributed across multiple computers.

In the following paragraphs, the embodiments are described in further detail by way of example with reference to the attached drawings. In the description, well known components, methods, and/or processing techniques are omitted or briefly described so as not to obscure the embodiments. As used herein, the "present disclosure" refers to any one of the embodiments described herein and any equivalents. Furthermore, reference to various feature(s) of the "present embodiment" is not to suggest that all embodiments must include the referenced feature(s).

Among embodiments, some aspects of the present disclosure are implemented by a computer program executed by one or more processors, as described and illustrated. As would be apparent to one having ordinary skill in the art, one or more embodiments may be implemented, at least in part, by computer-readable instructions in various forms, and the present disclosure is not intended to be limiting to a particular set or sequence of instructions executed by the processor.

The embodiments described herein are not limited in application to the details set forth in the following description or illustrated in the drawings. The disclosed subject matter is capable of other embodiments and of being practiced or carried out in various ways. Also, the phraseology and terminology used herein is for the purpose of description and should not be regarded as limiting. The use of "including," "comprising," or "having" and variations thereof herein is meant to encompass the items listed thereafter, additional items, and equivalents thereof. The terms "connected" and "coupled" are used broadly and encompass both direct and indirect connections and couplings. In addition, the terms "connected" and "coupled" are not limited to electrical, physical, or mechanical connections or couplings.

As used herein the terms "machine," "computer," "server," and "workstation" are not limited to a device with a single processor, but may encompass multiple devices (e.g., computers) linked in a system, devices with multiple processors, special purpose devices, devices with various peripherals and input and output devices, software acting as a computer or server, and combinations of the above.

Disclosed herein are various embodiments of devices, systems and methods for sensing and integrating data of environmental conditions in animal research. Beginning with FIG. 1, shown is an example of a collection device 103 adapted to collect and process data from a micro-environment 100 of a research animal cage 104. The collection device 103 includes a housing 105 that is sized and shaped to house components. One example embodiment of the collection device 103 is a SIDECARe™ developed by Tricorder Array Technologies, LLC of Birmingham, Alabama. The collection device 103 collects passive sensor readings from the micro-environment 100. The resulting data can be computed and recorded to cloud-based computers and databases for further analysis, reporting and notification—and will interface with existing tracking software. The collection device 103 can work with any cage 104, e.g., a cage from Thoren Caging Systems, Inc. of Hazleton, Pennsylvania. The collection device 103 can continuously detect mouse pups, monitor light-temperature and humidity at the cage 104 level, collect census, detect events based at least in part on Mouse Ultrasonic Vocalizations (MUSV), and performs other functions. The systems and methods of the present disclosure can detect and create many types of event notifications. The data obtained is rich enough to identify a multitude of events. In addition, the disclosed systems and methods provide for embedded processing of the rodent vocalization data so as to reduce the amount of data required to be transmitted wirelessly to the computing environment.

Cloud-based software can talk to the collection device 103 through WiFi routers. Systems and methods disclosed herein can device a location of the collection device 103 based on the known location of a facility's WiFi routers, and use the received signal strength (RSS) measurement from each router that picks up the transmitter's WiFi signal to "triangulate" the position of one or more sensors of the collection device 103. The present disclosure provides an approach to development of rodent vocalization classification and data reduction for the purpose of assessing rodent well-being in research cage environments.

In the following discussion, a general description of the disclosed system and its components is provided, followed by a discussion of the operation of the same.

Figure 2:
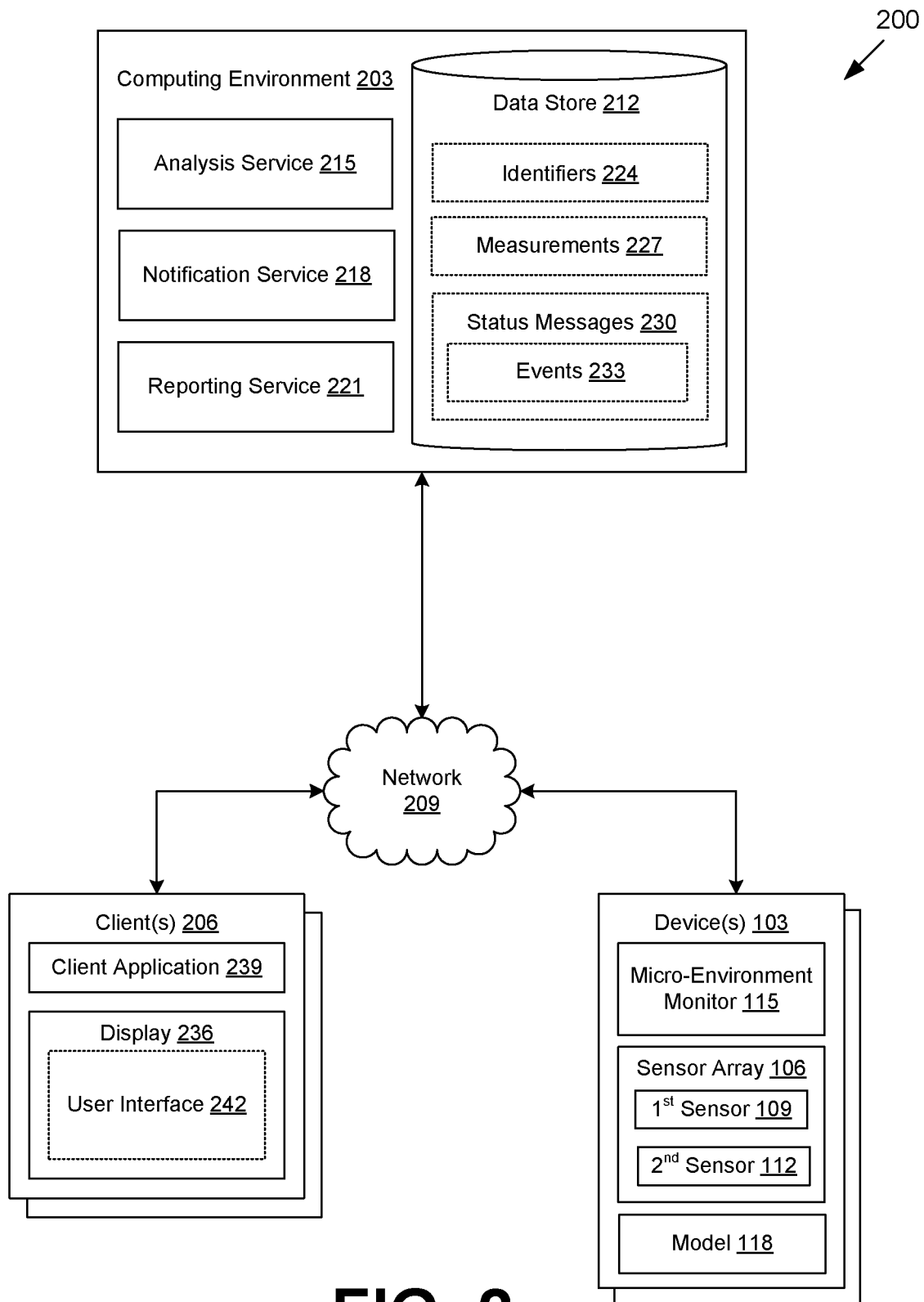
FIG. 2 is a drawing of a system and networked environment according to various embodiments of the present disclosure.

Moving on to FIG. 2, shown is a system 200 according to various embodiments. The system 200 includes computing environment 203, collection device(s) 103, and clients 206 which are in data communication with each other via a network 209. The network 209 includes, for example, the Internet, intranets, extranets, wide area networks (WANs), local area networks (LANs), wired networks, wireless networks, near-field communication (NFC), or other suitable networks, etc., or any combination of two or more such networks. For example, such networks may comprise satellite networks, cable networks, Ethernet networks, and other types of networks.

The computing environment 203 may comprise, for example, a server computer or any other system providing computing capability. Alternatively, the computing environments 203 may employ a plurality of computing devices that may be arranged, for example, in one or more server banks or computer banks or other arrangements. Such computing devices may be located in a single installation or may be distributed among many different geographical locations. For example, the computing environments 203 may include a plurality of computing devices that together may comprise a hosted computing resource, a grid computing resource and/or any other distributed computing arrangement. In some cases, the computing environments 203 may correspond to an elastic computing resource where the allotted capacity of processing, network, storage, or other computing-related resources may vary over time.

Various applications and/or other functionality may be executed in the computing environments 203 according to various embodiments. Also, various data is stored in a data store 212 that is accessible to the computing environment 203. The data store 212 may be representative of a plurality of data stores 212 as can be appreciated. The data stored in the data store 212, for example, is associated with the operation of the various applications and/or functional entities described below.

The components executed on the computing environment 203, for example, include an analysis service 215, notification service 218, and a reporting service 221, and other applications, services, processes, systems, engines, or functionality not discussed in detail herein. The analysis service 215 is executed to perform data analytics and apply modern data science, and machine learning (ML) techniques to the data in the data store 212. The notification service 218 is executed to create alerts and other notifications for the operations for the animal facility (e.g., staff), Principal Investigator (PI), or other users of the system 200.

The reporting service 221 is executed to generate and render user interfaces and reports to the clients 206. Various reports can be generated, e.g., for operations, for animal health, or for Principal Investigators (PI). Reports for operations can include 1) Cages in use (Census), 2) Cages in use without protocol link, and other reports. Reports for animal health can include 1) Water condition serious, 2) Animal in distress, 3) Fighting possible, 4) Newborn pups (or other animals) in cage, 5) Dermatitis possible, 6) Temperature out of range, 7) Sleep rhythm out of sync, and other reports. Reports for PI's can include 1) Environment history, 2) Activity history, 3) Detection of pups', 4) Other observations that created a notification, and other reports.

The components executed on the computing environment 203 can include technology that trains a neural network model 118. The computing environment 203 can run a training application to train a neural network using MUSV and other data. Training refers to a process of creating a trained neural network model 118 by applying a framework, for example a deep learning framework, to a dataset. A training framework is a software library used to design, build, and train machine learning models. Examples training frameworks include TensorFlown™, Caffe, Apache® Singa, Microsoft® Cognitive Toolkit (CNTK), Theano, and Torch. A training framework uses deep learning methods to output a model 118. The model 118 is a snapshot of the trained neural network stored in the collection device 103 so that the micro-environment monitor 115 can use the trained neural network to perform an inference. One advantage of using the TensorFlown™ framework is that embodiments of the collection devices 103 that are embedded systems or single board computers can use a TensorFlown™ output or model to perform an inference.

The data stored in the data store 212 includes, for example, identifiers 224, measurements 227, status messages 230, and potentially other data. Identifiers 224 are unique identifiers associated with the collection devices 103 or the cages to which they are attached. Identifiers 224 may conform to the Universally Unique Identifier (UUID) standard, and may include, for example, Globally Unique Identifiers (GUIDs), or other identifiers. Measurements 227 are measurements that relate to temperature, humidity, light intensity, light density, or motion associated with the cage 104 or within the cage environment 100 (FIG. 1). The measurements 227 can relate to environmental measurements, or any measurements that can be based at least in part on a micro-environment 100 (FIG. 1) of the cage 104. Examples of measurements 227 include temperature, humidity, motion detection, and light intensity.

Status messages 230 are messages about events concerning an animal in the cage 104. In some embodiments, the status messages 230 are based at least in part on at least one of: audio content captured by the sensor array 106, or a measurement provided by the sensor array 106. The status messages 230 can include events 233 comprising no abnormal events detected, no rodent detected, a flooded cage event, a presence of mouse pups event, a presence of aggressive fighting event, a presence of injury event, a presence of chronic pain event, a presence of mating event, or other events of interest concerning the micro-environment 100 (FIG. 1) of the cage 104. In some embodiments, the status messages 230 can be based a combination of the audio content captured by the sensor array 106 and the measurements 227 provided by the sensor array 106. Status messages 230 can also be related to pain, ulcerative dermatitis, or other conditions related to an animal in the cage 104.

The clients 206 are representative of a plurality of client devices that may be coupled to the network 209. The clients 206 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, wearable devices, or other devices with like capability. The clients 206 may include respective displays 236. The displays 236 may comprise, for example, one or more devices such as liquid crystal display (LCD) displays, gas plasma-based flat panel displays, organic light emitting diode (OLED) displays, electrophoretic ink (E ink) displays, LCD projectors, or other types of display devices, etc.

The clients 206 may be configured to execute various applications such as a client application 239, or other applications. The client application 239 may be executed in a respective client 206, for example, to access network content served up by the computing environments 203 or other servers. To this end, the client application 239 may comprise, for example, a browser, a dedicated application, etc. The clients 206 may be configured to execute applications beyond the client application 239 such as, for example, email applications, word processors, spreadsheets, numerical computing and simulation applications, or other applications.

The collection device 103 is representative of a plurality of collection devices 103 that may be coupled to the network 209. The collection devices 103 may comprise, for example, a processor-based system such as an Adafruit Feather or other computer system that can collect data from the cage 104 and communicate it through the network 209 to the computing environment 203.

The collection device 103 can include a sensor array 106 to sense a micro-environment 100 of the cage 104 (e.g., isolate and sense the environment of the cage 104). To this end, the sensor array 106 can include a first sensor 109 such as an microphone or other audio input device capable of capturing and encoding audio content (e.g., audible and ultrasonic audio content) for processing by the collection device 103. Examples of the captured audio content may include ambient noise, MUSV, and other sounds in the cage 104. The sensor array 106 can also include a second sensor 112 comprising a position sensor, a temperature sensor, a humidity sensor, a light sensor, a motion sensor, or other sensor that provides a measurement associated with an environment of the cage 104 (e.g., the micro-environment 100 depicted in FIG. 1). The sensor array 106 may also be capable of other inputs or functionality discussed herein and as can be appreciated.

The components executed on the collection device 103, for example, include a micro-environment monitor 115, and other applications, services, processes, systems, engines, or functionality not discussed in detail herein. The micro-environment monitor 115 is executed to collect and process data from a specific cage 104. To this end, the collection device 103 (e.g., the micro-environment monitor 115) can include a network interface (e.g., a transceiver). The micro-environment monitor 115 can include at least one processor and program instructions stored in memory and executable by the at least one processor that, when executed, cause the micro-environment monitor 115 to perform various functions. The collection device 103 can also include a neural network model 118. The model 118 is a snapshot of a trained neural network stored in the collection device 103.

Next, a general description of the operation of the various components of the system 200 is provided. To begin, a collection device 103 can send data to the computing environment 203 using the network interface. The data can be based on the audio content captured by the sensor array 106, a measurement 227 provided by the sensor array 106, or other measurements. For example, the data may comprise a status message 230 concerning a mouse, other rodent, or other animal in the cage 104. Example status messages 230 include events 233 comprising a flooded cage event, a presence of mouse pups event, a presence of aggressive fighting event, a presence of injury event, a presence of chronic pain event, or a presence of mating event. In some embodiments, the micro-environment monitor 115 can obtain the audio content captured by the sensor array 106, or the measurement provided by the sensor array 106.

The micro-environment monitor 115 can process the audio content to determine that audible or ultrasonic vocalizations of a mouse or other animal are present. For example, the micro-environment monitor 115 can apply a trained neural network model 118 to determine a classification of the audible or ultrasonic vocalizations of the animal.

Specific aims of the system 200 can include the following. Mouse ultrasonic vocalizations (USV) are as rich and diverse as the human voice. The collection device 103 can include a sensor array 106 that uses an internet of things (IoT) platform, and includes an ultrasonic (US) microphone (e.g., first sensor 109, FIG. 2), which when coupled with machine learning (ML) and artificial intelligence (AI) has the potential to identify specific activities and even individual mice. The present systems and methods can identify over sixty (60) different syllables.

Impact: The principles of the "Three Rs," (Refinement, Reduction and Replacement) is a driving principle in biomedical research using animals since 1959. The collection device 103 can have significant impact on refining research, and reducing animal numbers. The collection device 103 can also play a supportive role in the eventual replacement of some animal models by making research with mice more robust and translatable to humans. For example: 1) (Refinement) Interviews with leading and area animal facility directors indicated mice found dead is the number one issue facing their programs. At the University of Alabama at Birmingham (UAB), animals found dead account for 40% of health reports. Most of these instances have no prior reports of abnormalities within the cage 104. A significant number of mouse deaths, for example, can be attributed to fighting or common medical issues, and water system failures (cage flooding, and malfunction preventing a water supply). With 90% of cases reported at cage change, electronic monitoring of a cage 104 has the potential to detect abnormalities earlier and allow for intervention before animals are lost. 2) (Reduction) By making data available on every individual cage to the Principal Investigator (PI), it enables retrospective investigation into possible reasons for data outliers. AI modeling can then flag cages 104 that threaten to stray outside set parameters, allowing time for intervention before confounding effects to the experiment have occurred. An example is the impact temperature and light variations have on the outcome of experiments.

Innovative Hypothesis: ML and AI can easily determine patterns indicative of social interactions in mouse USVs. For example, in encounters between male mice, characteristic USV calls are present during naso-nasal contacts and body sniffing, before fighting starts. Stress-associated "harmonic" USV calls, made up of complex frequency fluctuation in scale structure, occur during the fight. By using AI to analyze USV from individual cages 104 to identify these characteristic sounds, fighting should be predictable, allowing for separation of animals before wounds or death occurs. Other categorization of mouse USVs already includes, pups verses adults, male verses female, different moods, and possibly individual animals, which illustrates the tremendous potential of the collection device 103. Therefore, it can be desirable to use a suitable, low-cost microphone for in cage use that can detect USV.

Value Proposition: The collection device 103 offers an affordable option with an desirable form-factor to help solve preventable animal deaths and eliminate cumbersome manual or semi-automated data entry for census. The system 200 has paired sensors and AI in a provocative way, using mouse USV. Ultrasonic (US) microphones coupled with AI to analyze USV can represent a significant innovative impact in the field. For example, the sensor array 106 that is incorporated into the collection device 103 can contribute to the micro environmental picture of each cage 104. The computing environment 203 can compare data from the sensor array 106 of a first collection device 103 against other collection devices 103 to confirm or enhance the AI conclusion. Humidity, temperature, light, and motion detection can also be compared or otherwise processed. The form factor, pricing to enable placing on all cages in a facility, and use of the collection device 103 can be a significant contribution to the field. Consequently one aspect of the present disclosure focuses on using sensors of the sensor array 106 to capture and process USV. Non-USV sensors of the collection device 103 can also fill a role. The system 200 can fulfill the various aims and milestones, as further discussed below.

Figure 3:
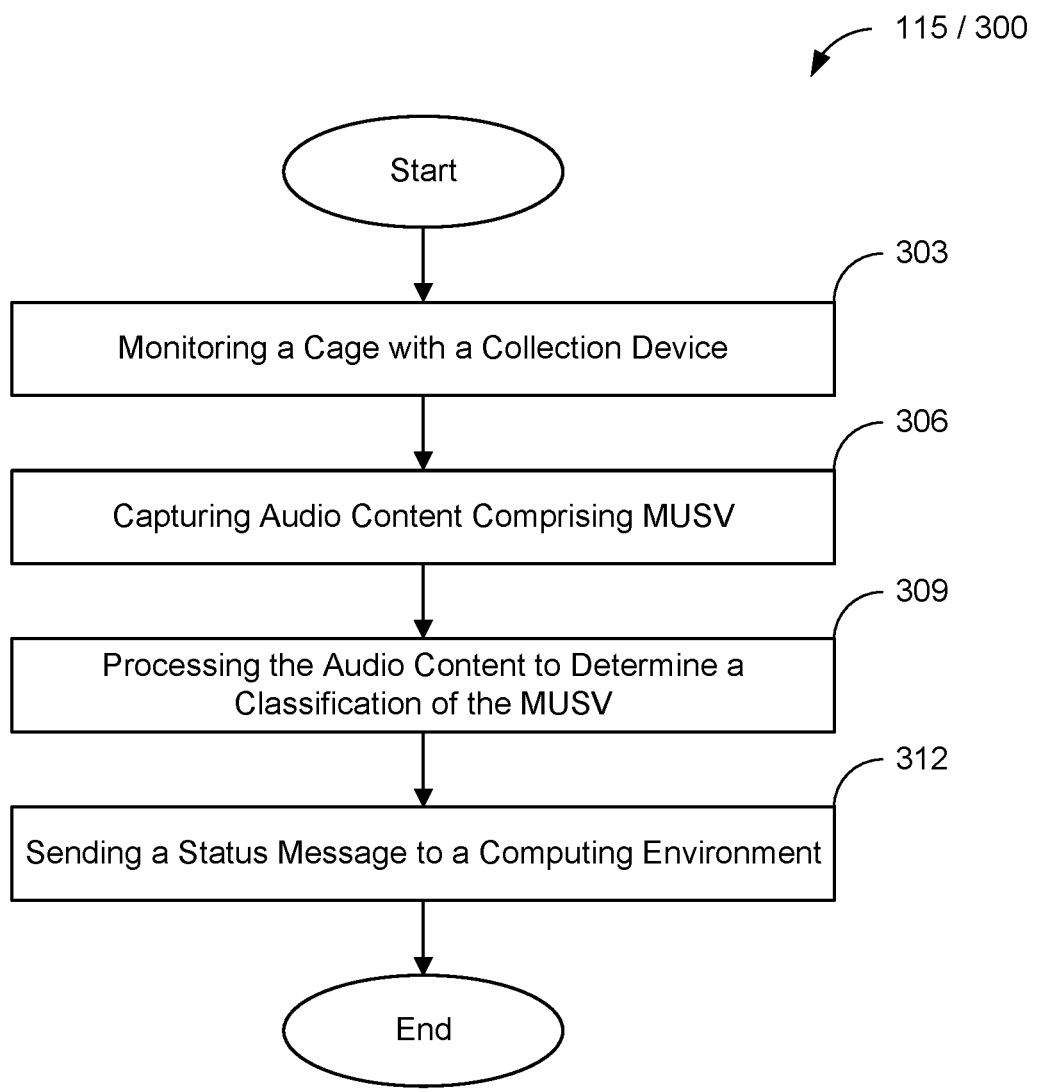
FIG. 3 is a flowchart illustrating one example of functionality implemented as portions of an application executed in a computing device in the system and networked environment of FIG. 2 according to various embodiments of the present disclosure.

Referring next to FIG. 3, shown is a flowchart that provides one example of the operation of a portion of the micro-environment monitor 115 according to various embodiments. It is understood that the flowchart of FIG. 3 provides merely an example of the many different types of functional arrangements that may be employed to implement the operation of the portion of the micro-environment monitor 115 as described herein. As an alternative, the flowchart of FIG. 3 may be viewed as depicting an example of elements of a method 300 implemented in the collection device 103 (FIG. 2) according to one or more embodiments.

Beginning with box 303, the micro-environment monitor 115 monitors a cage 104 with a sensor array 106 having a plurality of sensors. The micro-environment monitor 115 uses the sensor array 106, which can include the plurality of sensors, to monitor the cage 104. Monitoring the cage 104 can include the micro-environment monitor 115 obtaining a measurement provided by a sensor of the sensor array 106. Example sensors include a position sensor, a temperature sensor, a humidity sensor, a light sensor, or a motion sensor. At box 306, the micro-environment monitor 115 can capture audio content comprising MUSV. For example, the sensor array 106 can include a first one of the sensors 109 configured to capture audio content comprising audible or ultrasonic vocalizations of an animal in the cage 104. In some embodiment, the animal in the cage 104 is a mouse or other rodent. At box 309, the micro-environment monitor 115 can process the audio content to determine a classification of the audio content. For example, the micro-environment monitor 115 can apply the model 118 to captured audio content to determine the classification of the ultrasonic vocalizations of the animal.

At box 312, the micro-environment monitor 115 can send a status message 230 concerning the animal to the computing environment 203. In some examples, the status message 230 can include a flooded cage event, a presence of mouse pups event, a presence of aggressive fighting event, a presence of injury event, a presence of chronic pain event, a presence of mating event, or other events of interest concerning the micro-environment 100 (FIG. 1) of the cage 104. In some examples, the micro-environment monitor 115 can send data to the computing environment 203 that is based on at least one of: audio content captured by the sensor array 106, or a measurement provided by the sensor array 106. In some embodiments, the micro-environment monitor 115 sends data that is based on measurements 227 provided by the sensor array 106, either in addition to or instead of the status messages 230. The process can also proceed to completion.

Figure 4:
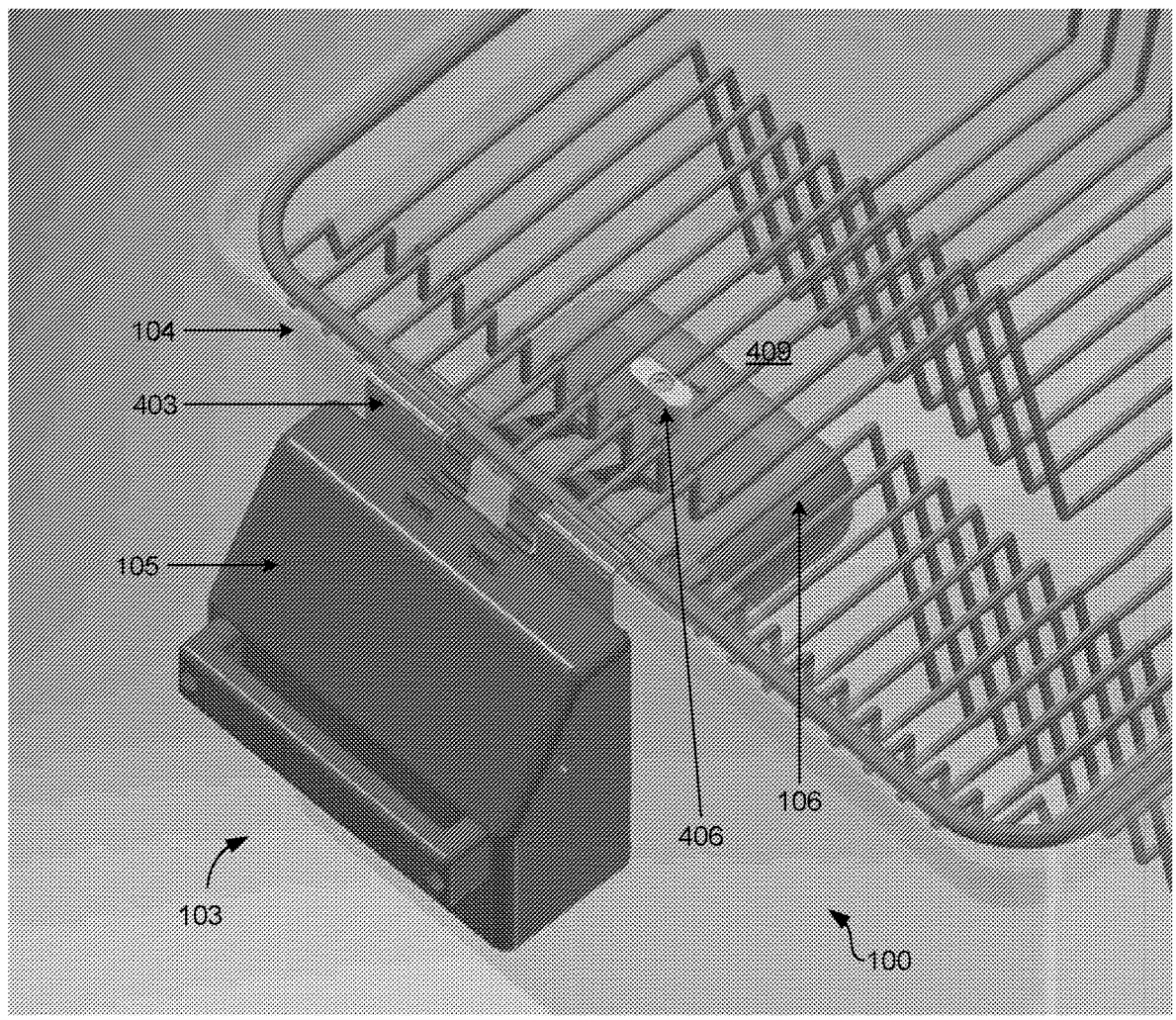
FIG. 4 is an example of a collection device according to various embodiments of the present disclosure.

FIG. 4 shows an example of a collection device 103 having a sensor array 106 configured to sense a micro-environment 100 of a cage 104. The collection device 103 can include at least one bracket 403 adapted to removably mount at least a portion of the collection device 103, such as the housing 105, to the cage 104. The collection device 103 can also include a fastener element 406 adapted to selectively engage with at least a portion 409 of the cage 104 to secure the sensor array 106 to the at least the portion 409 of the cage 104. For example, the at least the portion 409 of the cage 104 depicted in FIG. 4 can be a wire (or wires) of a wire bar lid of a Thoren cage.

Figure 5:
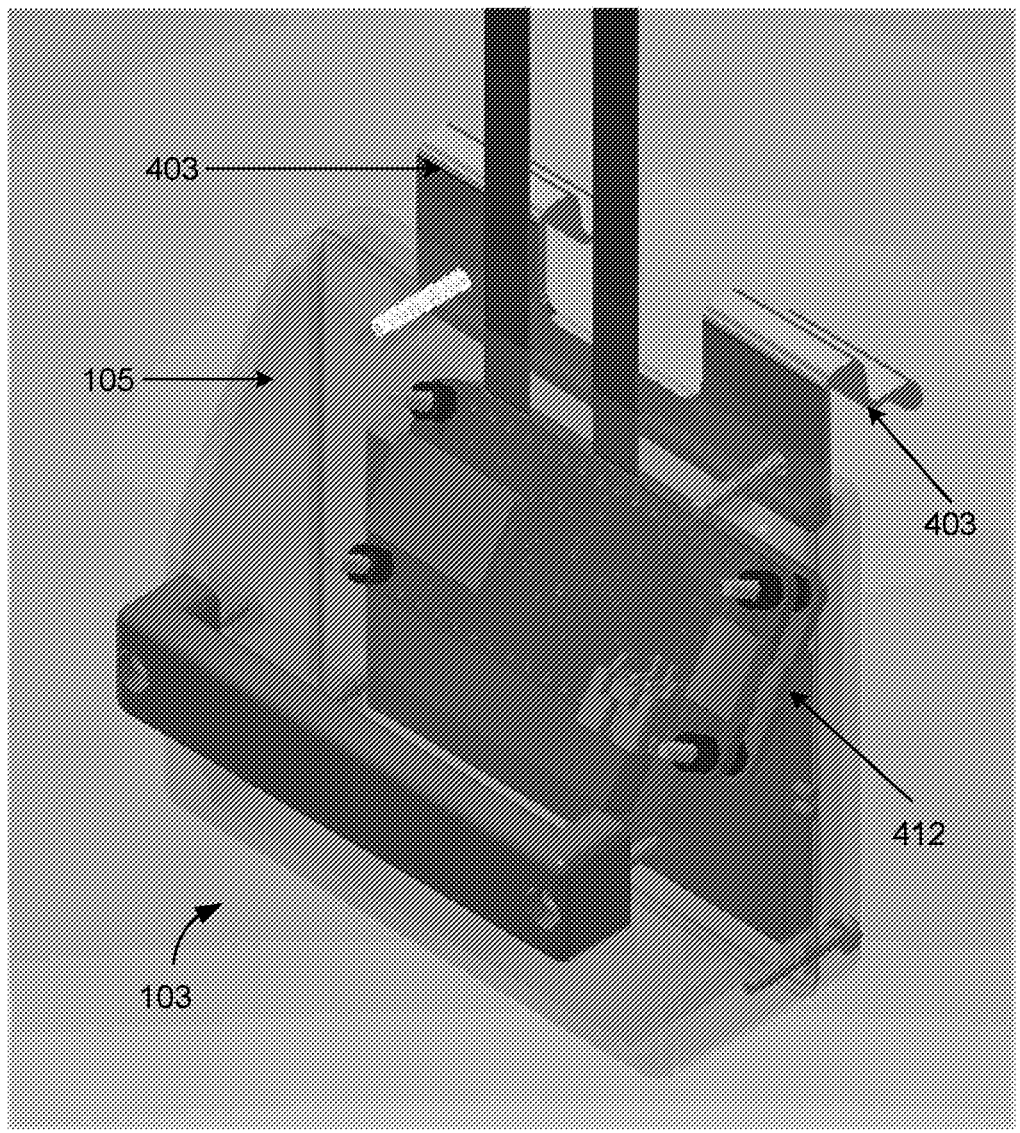
FIG. 5 is an example of a collection device according to various embodiments of the present disclosure.

FIG. 5 shows an example of a collection device 103 having a housing 105 and two brackets 403 which are adapted to removably mount the housing 105 to the cage 104 (FIG. 1). The housing 105 or the sensor array 106 (FIG. 1) can house one or more components including single board computer(s), microcontroller(s), processor(s), and the like. For example, the housing 105 or the sensor array 106 can house a component 412 that is an Adafruit Feather (e.g., nRF52 Bluefruit LE 3406), a BH1620 or other ambient light sensor, a HDC2010, SHTC3, or other humidity or digital sensor, a Z8FS040BSB20EG-SOIC or other microcontroller, SPH0641LU4H-1 or other microphone, one or more batteries, or other components.

Figure 6:
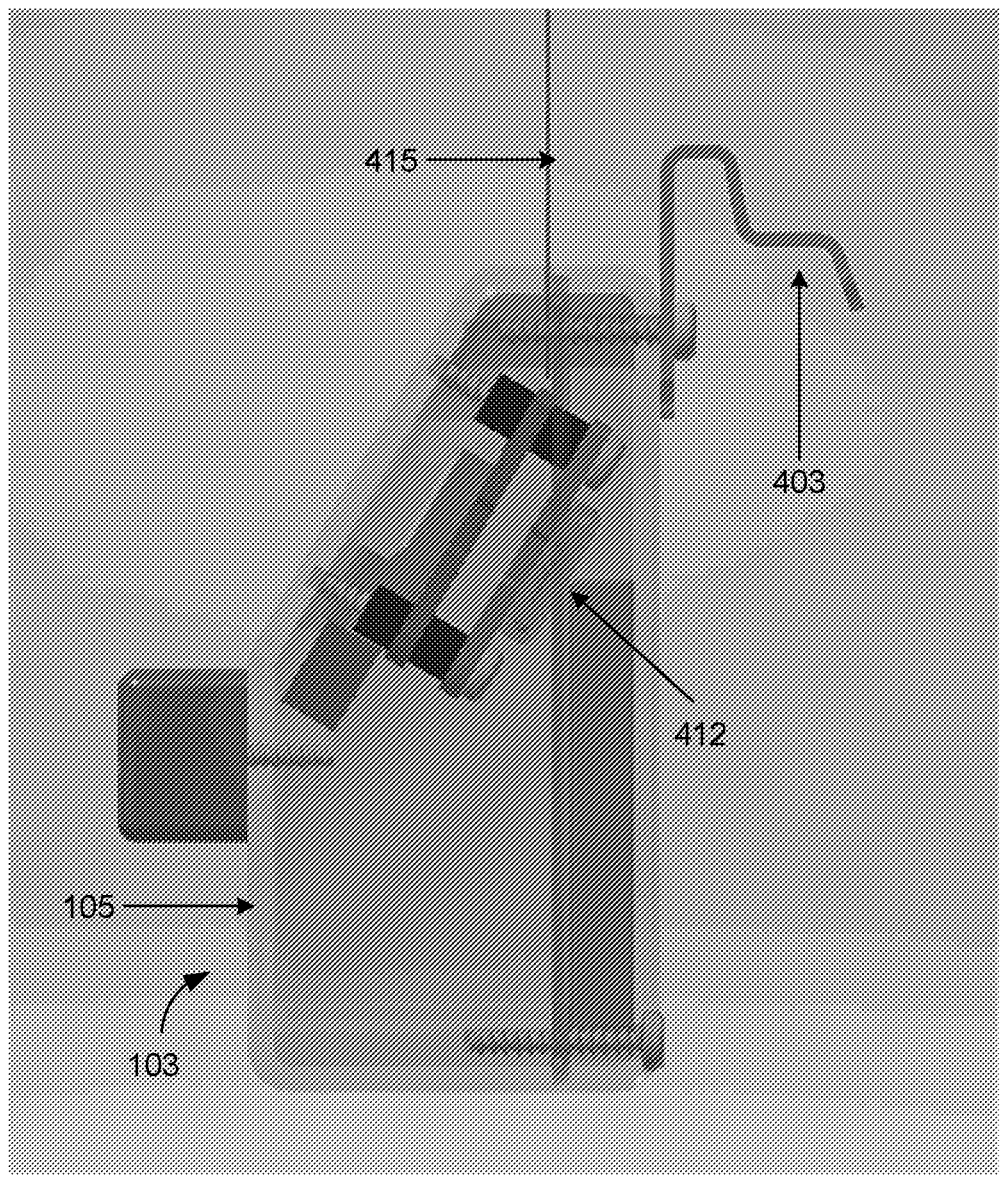
FIG. 6 is an example of side view of a collection device according to various embodiments of the present disclosure.

FIG. 6 shows a side view a collection device 103. In FIG. 6, the collection device 103 provides a cable 415 to electrically connect the component 412 with the sensor array 106 (FIG. 1). In some embodiments, the housing 105 and the sensor array 106 are distinct components that can be mounted at different places on the cage 104. Referring back to FIG. 1, the housing 105 is mounted on the side of the cage 104 and the sensor array 106 is mounted on the top of the cage 104 to wires of the wire bar lid of the cage 104. The cable 415 can be adapted to provide the sensor array 106, including microcontrollers or sensors therein, with an electrical connection to the component 412.

Figure 7:
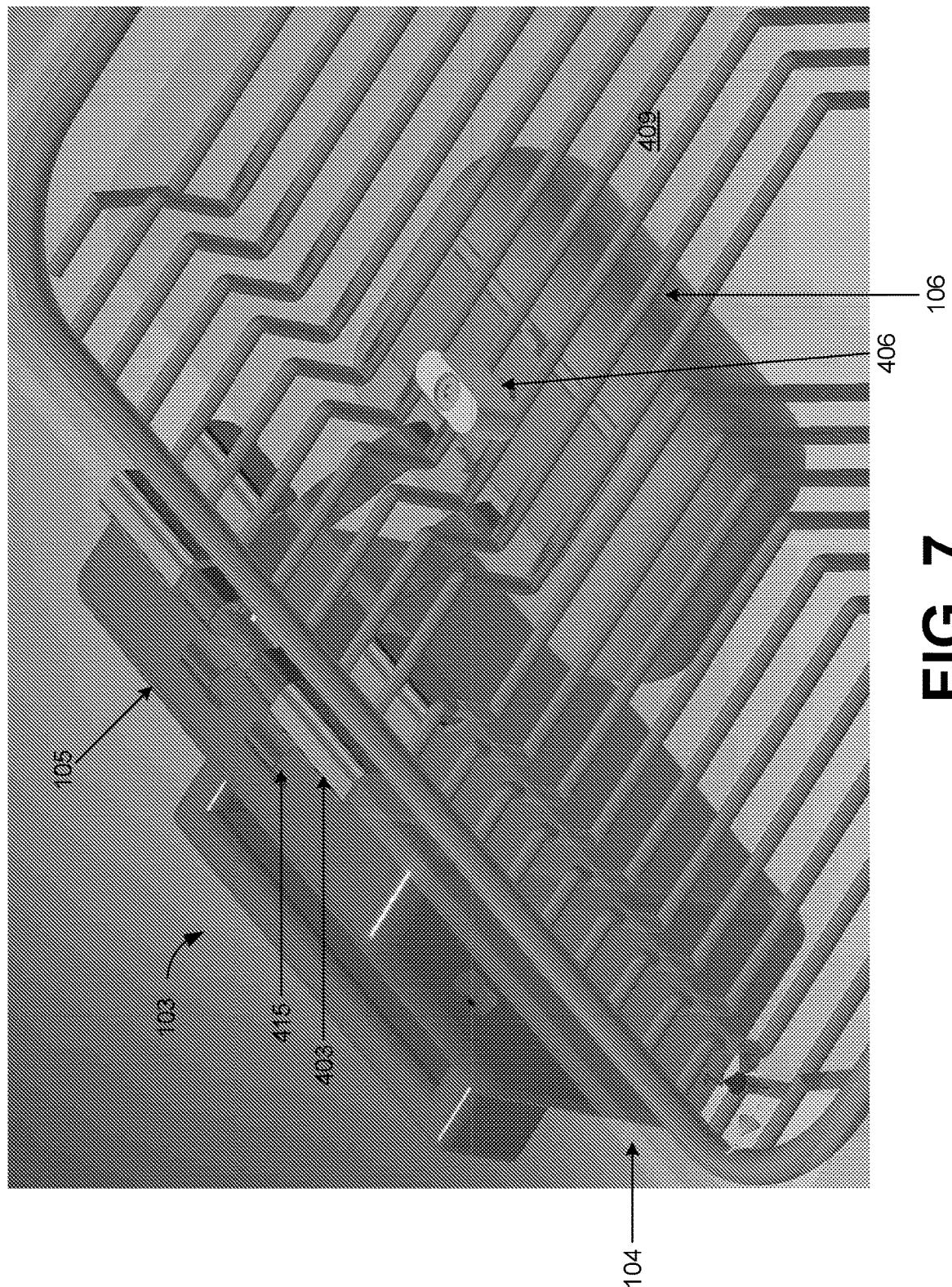
FIG. 7 is an example of a collection device according to various embodiments of the present disclosure.

FIG. 7 shows another view of the collection device 103 comprising the housing 105 and the sensor array 106. The housing of the collection device 103 has been removably mounted to the cage 104 using a bracket 403. The fastener element 406 of the sensor array 106 has selectively engaged with at least one wire of, or some other portion 409 of, a wire lid of the cage 104. The sensor array 106 and a component 412 (not depicted) housed in the housing 105 are in electrical connection using the cable 415.

Figure 8:
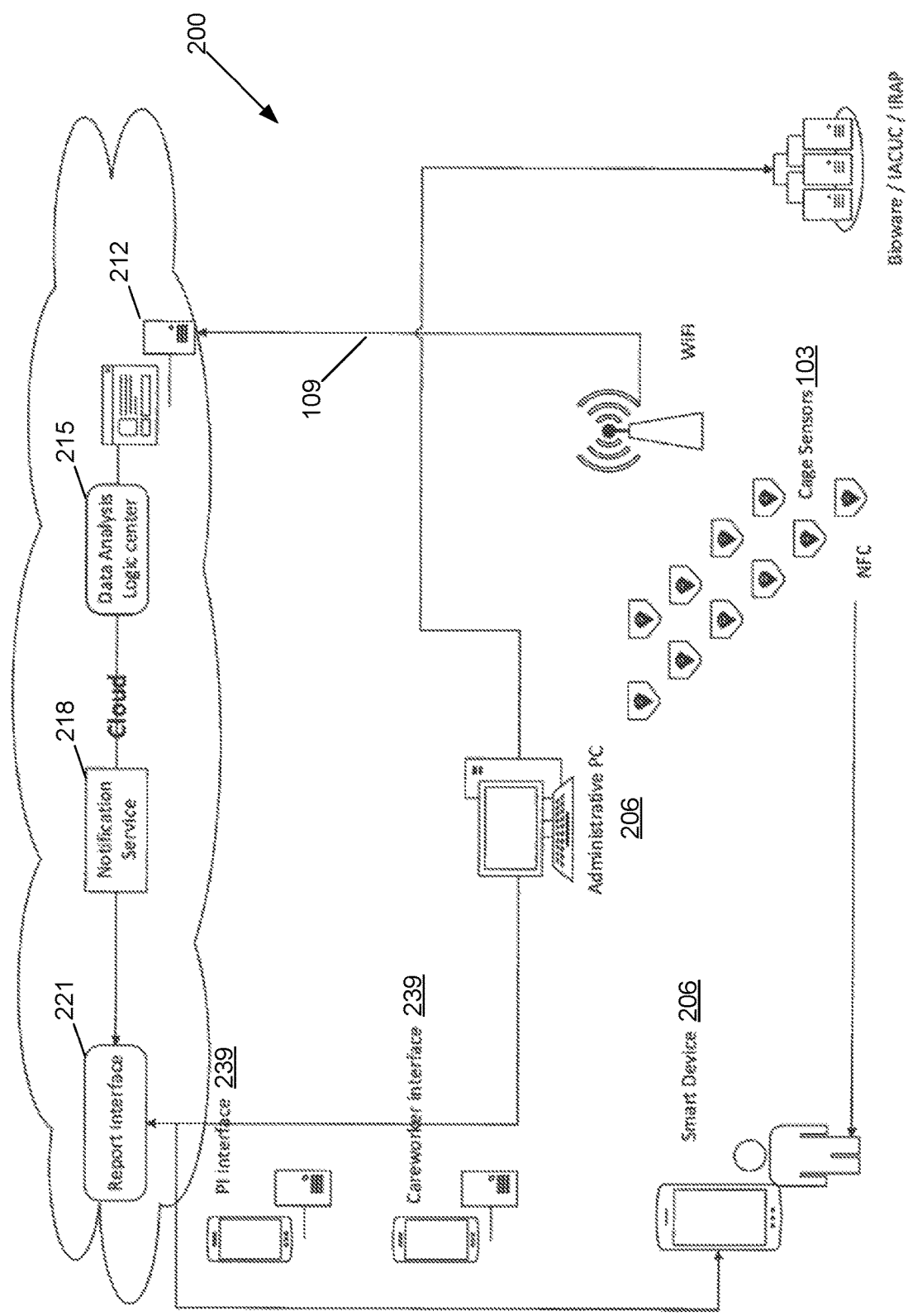
FIG. 8 is a drawing of a system according to various embodiments of the present disclosure.

FIG. 8 shows an example drawing of a system 200. The system 200 includes client computing devices 206 and collection device 103 (also depicted as cage sensors 103) which are in data communication with each other via one or more networks 209. The collection device 103 has sensors that isolate the environment of the cage 104 and collects data from the cage 104. The data can include date, time, position/location, temperature, humidity, light reading, movement or motion of the animal, and ultrasonic sounds that relate to events in the cage. The collection device 103 can determine what motion, movement, and/or sounds to record. In some examples, the data can be collected periodically, including on a schedule during the day. The collection device 103 uses a networking interface to communicate the data through the network 209 to the data store 212 using a communication protocol (e.g., IEEE 802.11 or Wi-Fi). The system 200 can also connect to (or include) a computing environment including animal informatics software, processes for Institutional Animal Care and Use Committee (IACUC), the UAB Integrated Research Administration Portal (IRAP) or other portal.

The collection device 103 provides a new way to collect data to monitor the health of research animals. Each collection device 103 can be equipped with five sensors giving the ability to determine environmental changes and issues related to animal welfare. Additional value features include animal census, automated data collection to the cloud and an at cage tap (mobile device) interface.

Research animal models are important to researchers. Meeting the requirements for compliance with all research animal care guidelines is costly; however, losing research animals that are in an active study would be much more costly. At present, quality census, daily checks, and ensuring controls affecting outcomes is a constant struggle.

Protecting the animal investment is an important issue the collection device 103 addresses. The collection device 103 collects data that can be used to improve the care of valuable research animals. In addition, the collection device 103 can improve repeatability by individually monitoring care environments. The collection device 103 can also enable evaluation of the frequency and the impact of common events in the animals' day.

Every day, research animals encounter events that are important to their care. A mouse can only withstand a 10 degree variation in its environment temperature. Low humidity can cause certain diseases. Circadian rhythm cycles are very important to the animals' mental metabolism. Sensors of the collection device 103 can report on 1) Temperature, 2) Humidity, 3) Light, 4) Motion and 5) Ultrasonic vocalization. Each of these data points have value. For example, mouse speech is ultrasonic. Mouse Ultrasonic Vocalizations, processed through Machine Learning (ML) and Artificial Intelligence (AI) algorithms, can detect events through mouse vocalization. MUSV's will be used to detect mouse pups, crying, mating, happy and content animals versus stressed animals. Motion will be used to detect cages in use for a robust and accurate census. Knowing about events allows intervention that improves the ability to care for the animals. Traditional data analytics, modern data science, and machine learning (ML) techniques can be applied to the sensor data.

Figure 9:
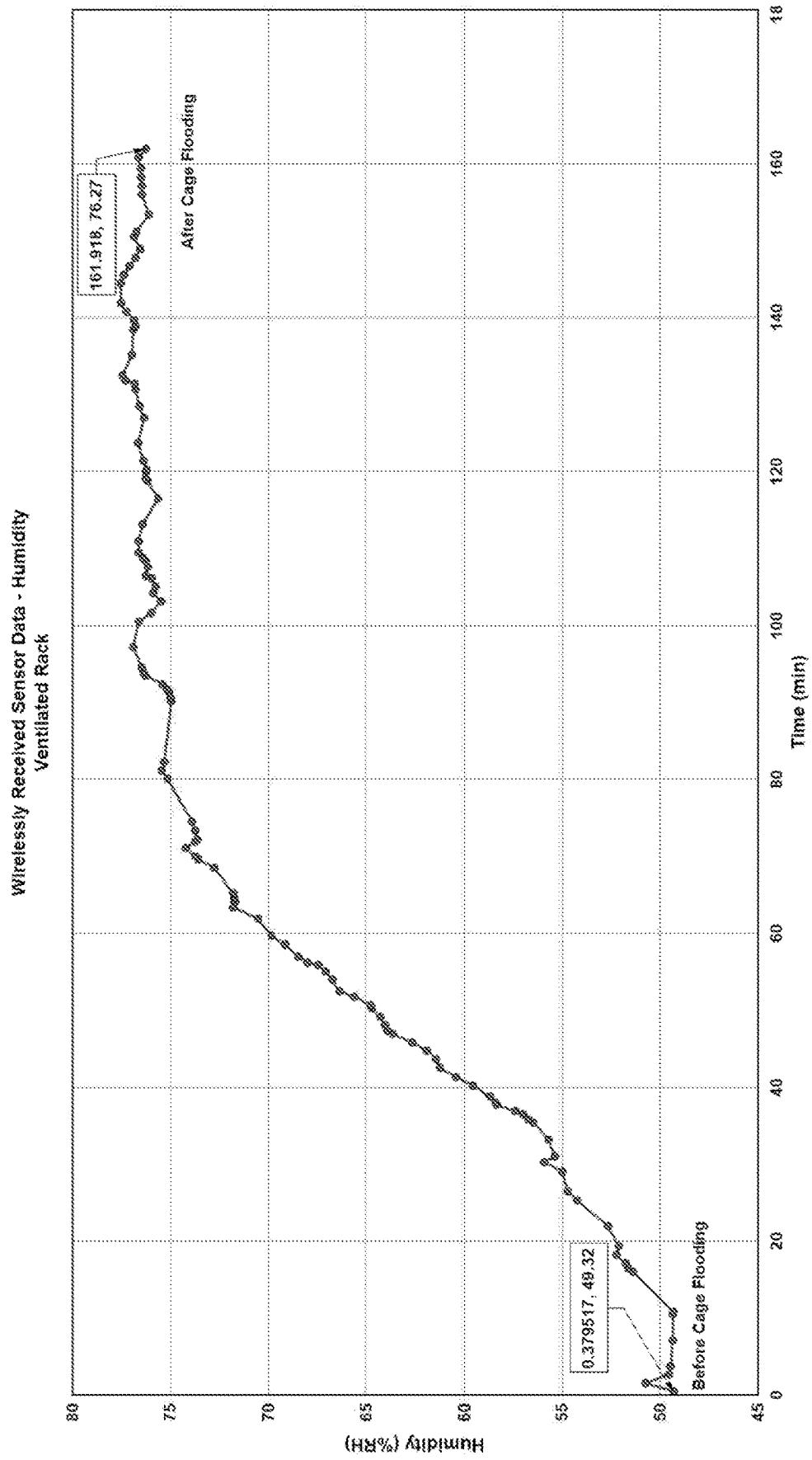
FIG. 9 is a plot according to various embodiments of the present disclosure.
Figure 10:
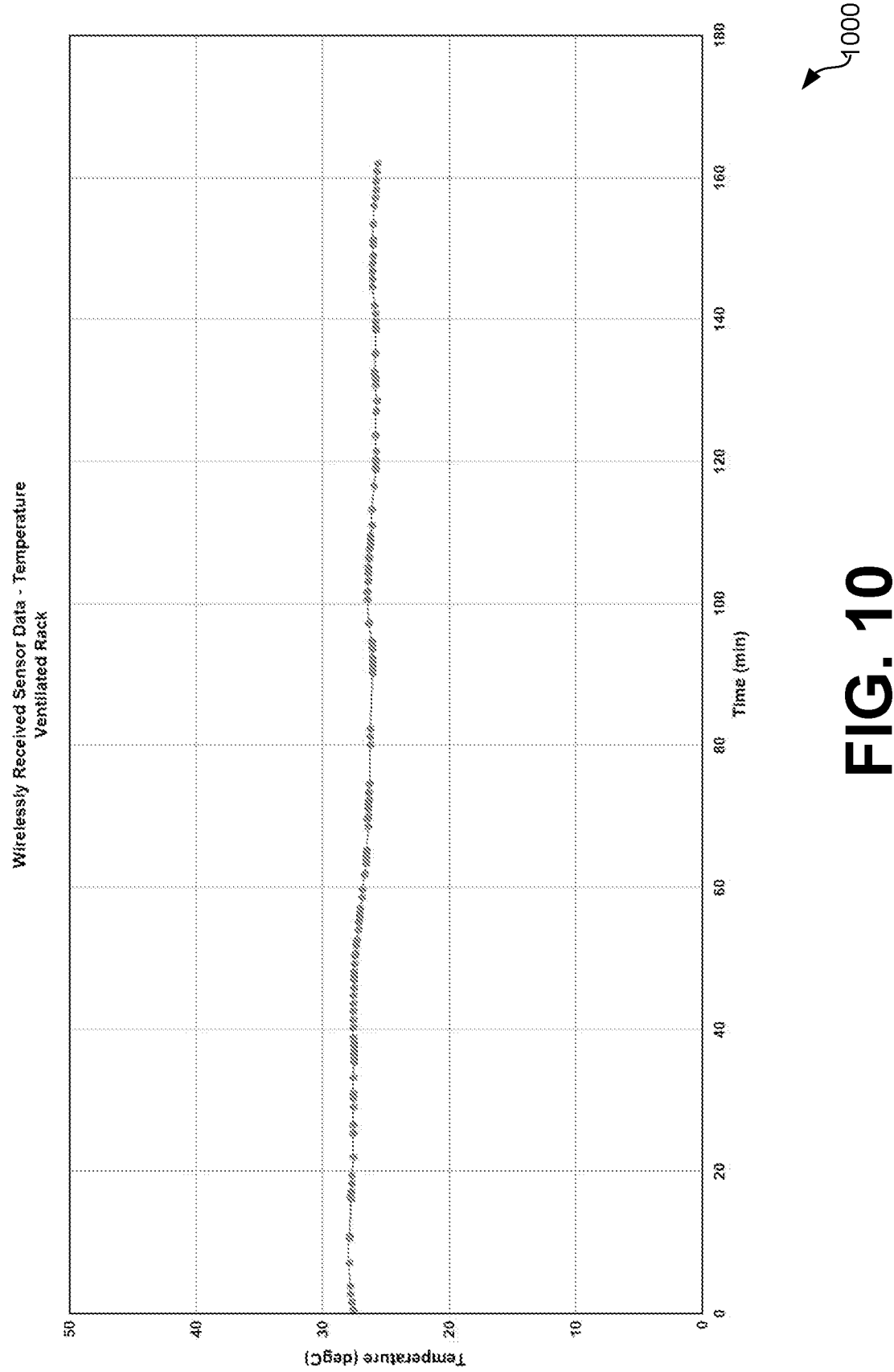
FIG. 10 is a plot according to various embodiments of the present disclosure.

In some embodiments of the system 200, analytics and anomalies can be identified after the data is collected and compared to a cage location database. FIG. 9 depicts a plot 900 related to a flooded cage event detected based at least in part with a second sensor 112 (FIG. 2) that is a humidity sensor. Humidity may vary day to day and hour by hour; however, when compared to cages nearby, a flooded cage can easily be picked out. Temperature can also show anomalies. Recent studies have confirmed temperature varies cage to cage as much as 5 degrees Fahrenheit. FIG. 10 depicts a plot 1000 based at least in part on a measurement 227 obtained from a second sensor 112 (FIG. 2) that is a temperature sensor.

Figure 11:
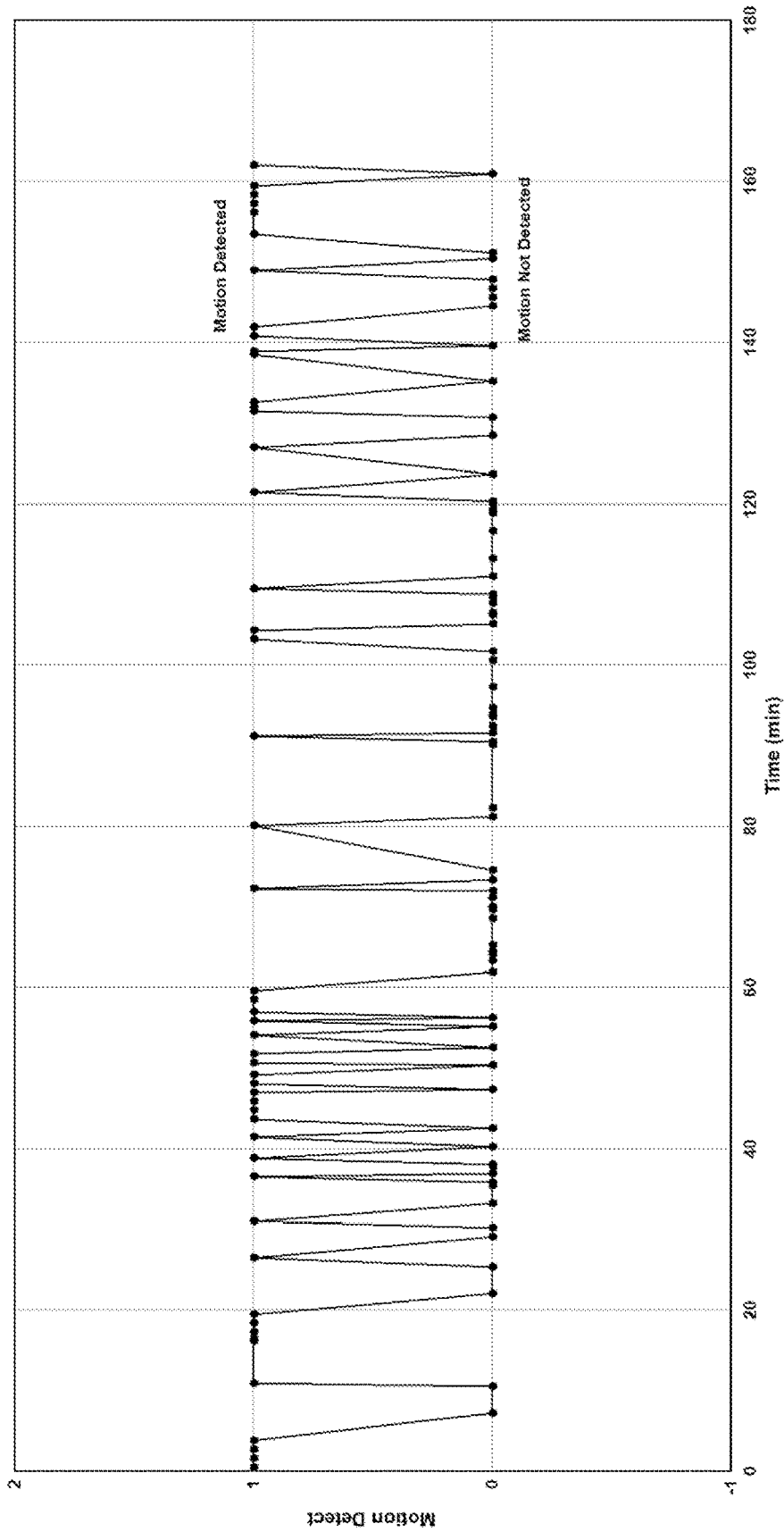
FIG. 11 is a plot according to various embodiments of the present disclosure.
Figure 12:
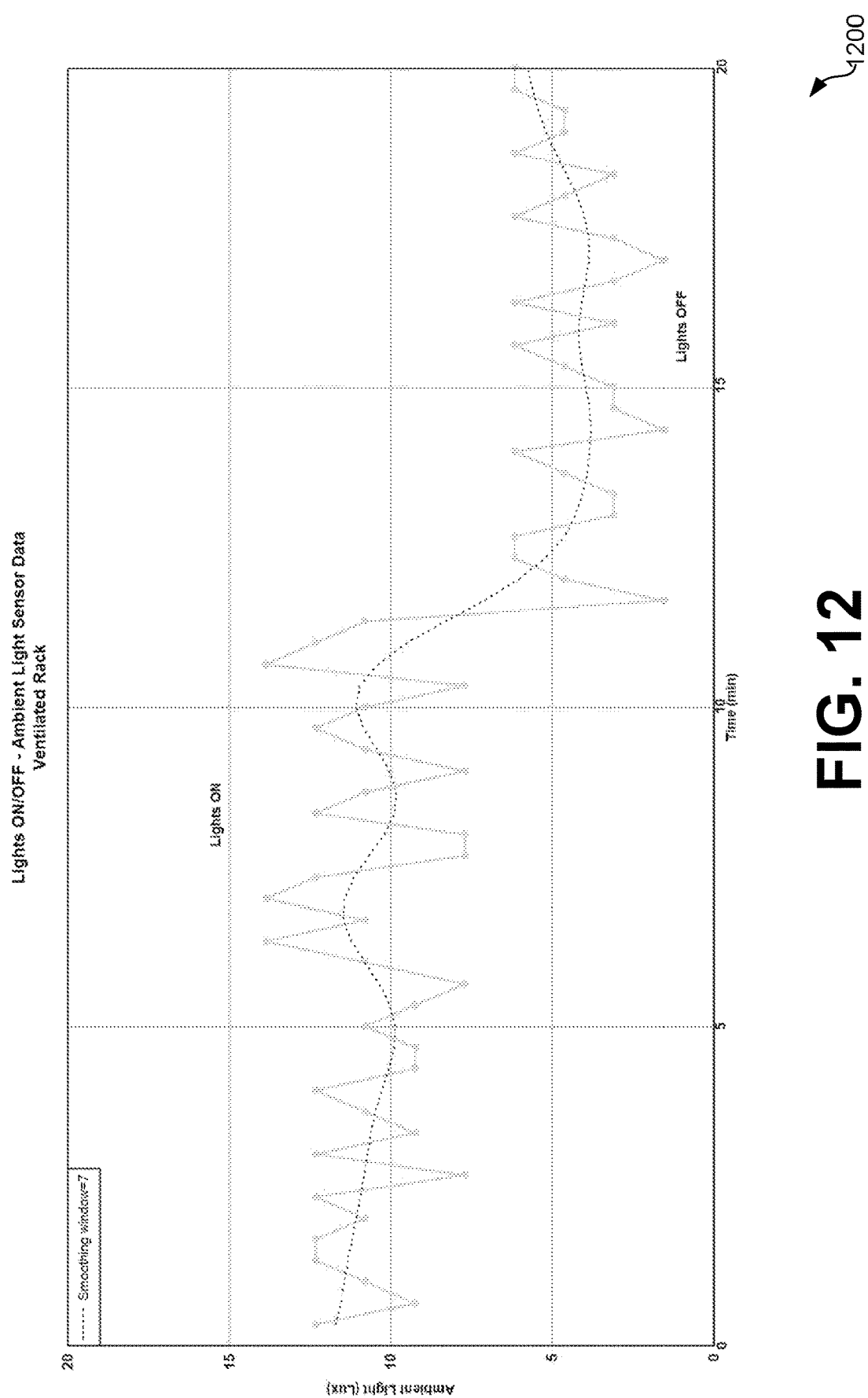
FIG. 12 is a plot according to various embodiments of the present disclosure.

FIG. 11 depicts a plot 1100 that shows the detection of motion in the cage 104 based at least in part on motion detected by a second sensor 112 (FIG. 2) that is a motion sensor. The sensor data shown in FIG. 11 can be used over a set of cages 104 to identify one or more cages 104 that are in use (e.g., by a live animal). Next, FIG. 12 depicts a plot 1200 showing measurements 227 obtained from a second sensor 112 (FIG. 2) that is an ambient light sensor. The loss of reliable data outcome may be compromised by a circadian rhythm disruption. Mapping these basic environmental variables gives insight to the animals' well-being as well as critical outlier notification that saves animals.

Variations can be reported to users (e.g., owners/care staff/vets) to allow events 233 (FIG. 2) to be mitigated. Environmental graphs and reports generated or rendered by the reporting service 221 (FIG. 2) may support research outcomes and lead to more efficient study and reduce stressful events. Stress in animals often affects their metabolism, as does the environment. Metabolism is a major factor in animal model outcomes.

Notifications and tracking of the many situations that animals face, via the notification service 218 (FIG. 2), will reduce the interruption of research and save Principal Investigators (PI) and research entities time and money. It is expected that the reduction of flooded cages and the detection of pups alone will greatly improve animal welfare and reduce costs.

The collection device 103 provides a way to link animal welfare to MUSV. MUSV analysis can reduce the impact of the number one issue all research institutions have in their Animal Program, "Mouse found dead". The importance of monitoring the health of research animals has become a focus for the work proposed. Research Computing and the use of high-performance computing (HPC) has led to breakthroughs and advancements. Various aspects of the present disclosure provide an important advance which is health monitoring through the monitoring and analytics of the communications of mouse ultrasonic vocalizations.

Health Monitoring—The social environment within a cage 104 is important. The disclosed systems and methods including the use of ultrasonic sensors allows us to listen to the mouse vocalization and interpret health and social events in the cage. Using artificial intelligence (AI) and other features of the system 200, we can identify: the presence of mouse pups, aggressive fighting, injury, chronic pain (e.g., dermatitis), or mating.

Figure 13:
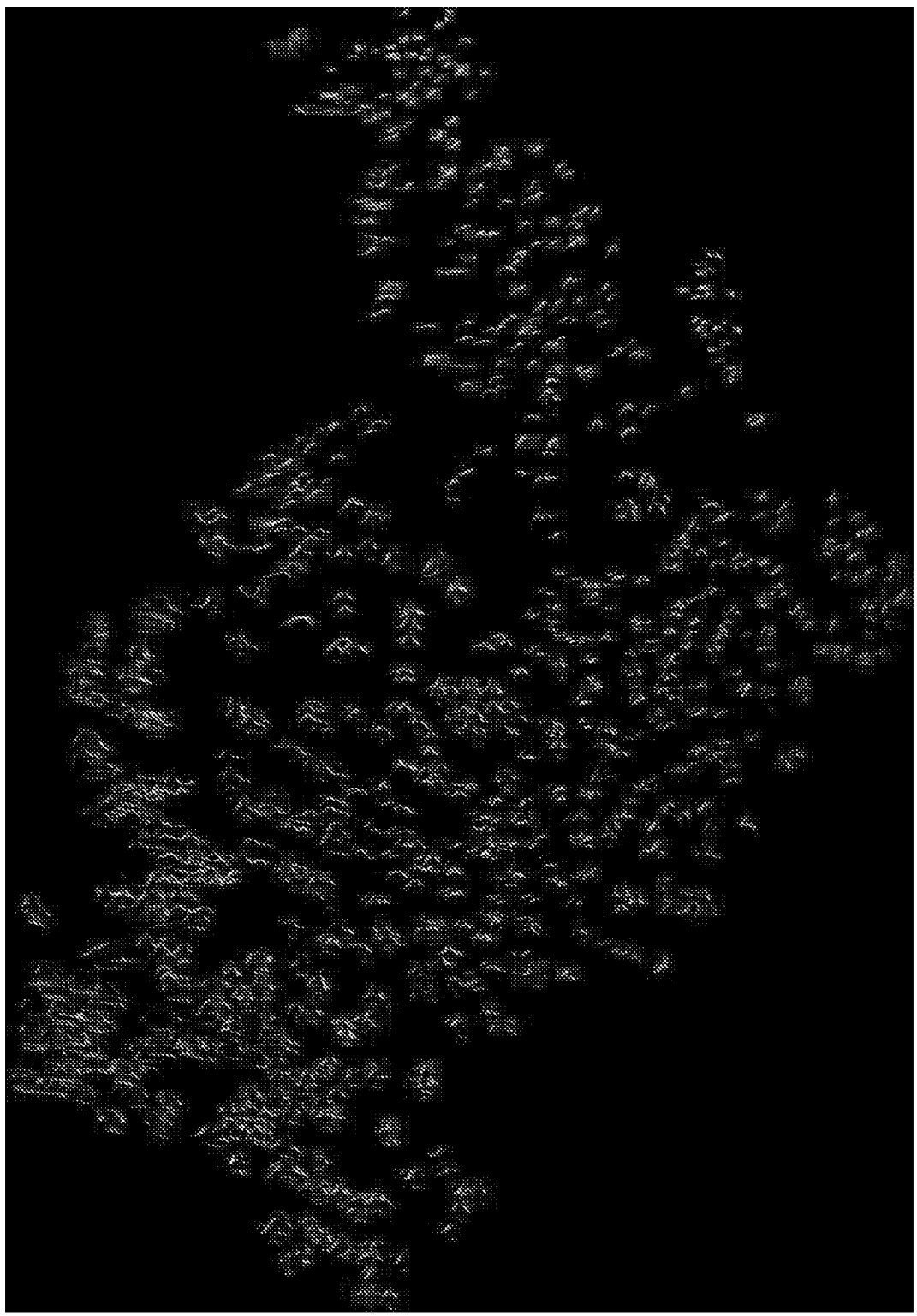
FIG. 13 is an example spectrogram and grouping of different mouse ultrasonic vocalizations (MUSV) according to various embodiments of the present disclosure.

In FIG. 13, an example spectrogram 1300 and grouping of different MUSV is shown. The MUSV were collected in home cage environments. One set was captured by setting the USV mics, without intervention (WI), in ports typically used for allowing mice to move between cages. Another set of USV sound files were collected at a cage change (CC) and shortly after, a flooded cage event (FCE) was introduced. The disclosed systems and methods processed the sounds collected using a series of tools scripted in Python. The disclosed systems and methods ultimately revealed interesting data using a new tool that runs in MATLAB called Deep Squeak. Deep Squeak provided a spectrogram comparison and grouping of different mouse vocalizations known as TSNE graphs.

Figure 14:
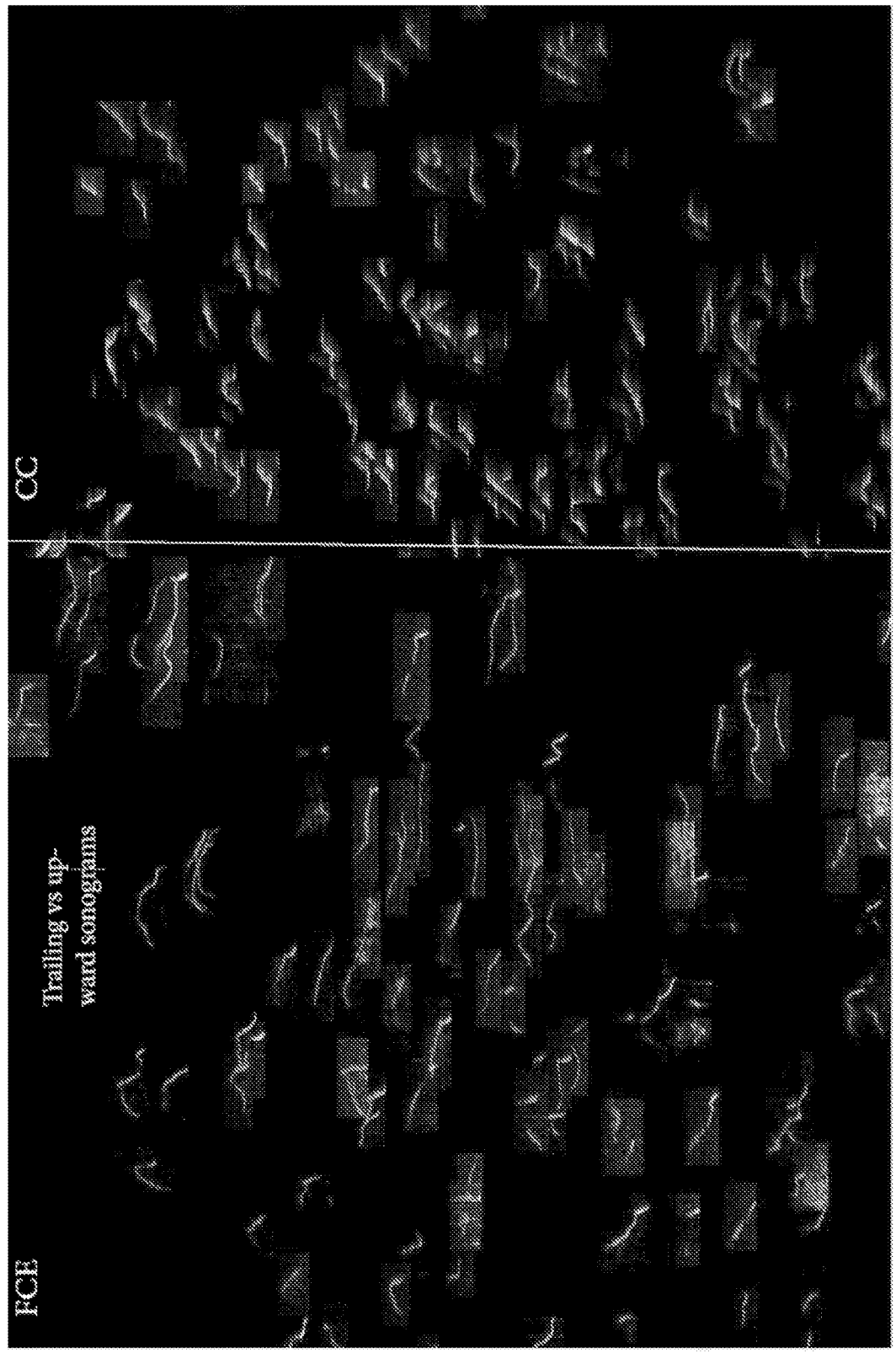
FIGS. 14 and 15 show example spectrograms and groupings of different MUSV according to various embodiments of the present disclosure.
Figure 15:
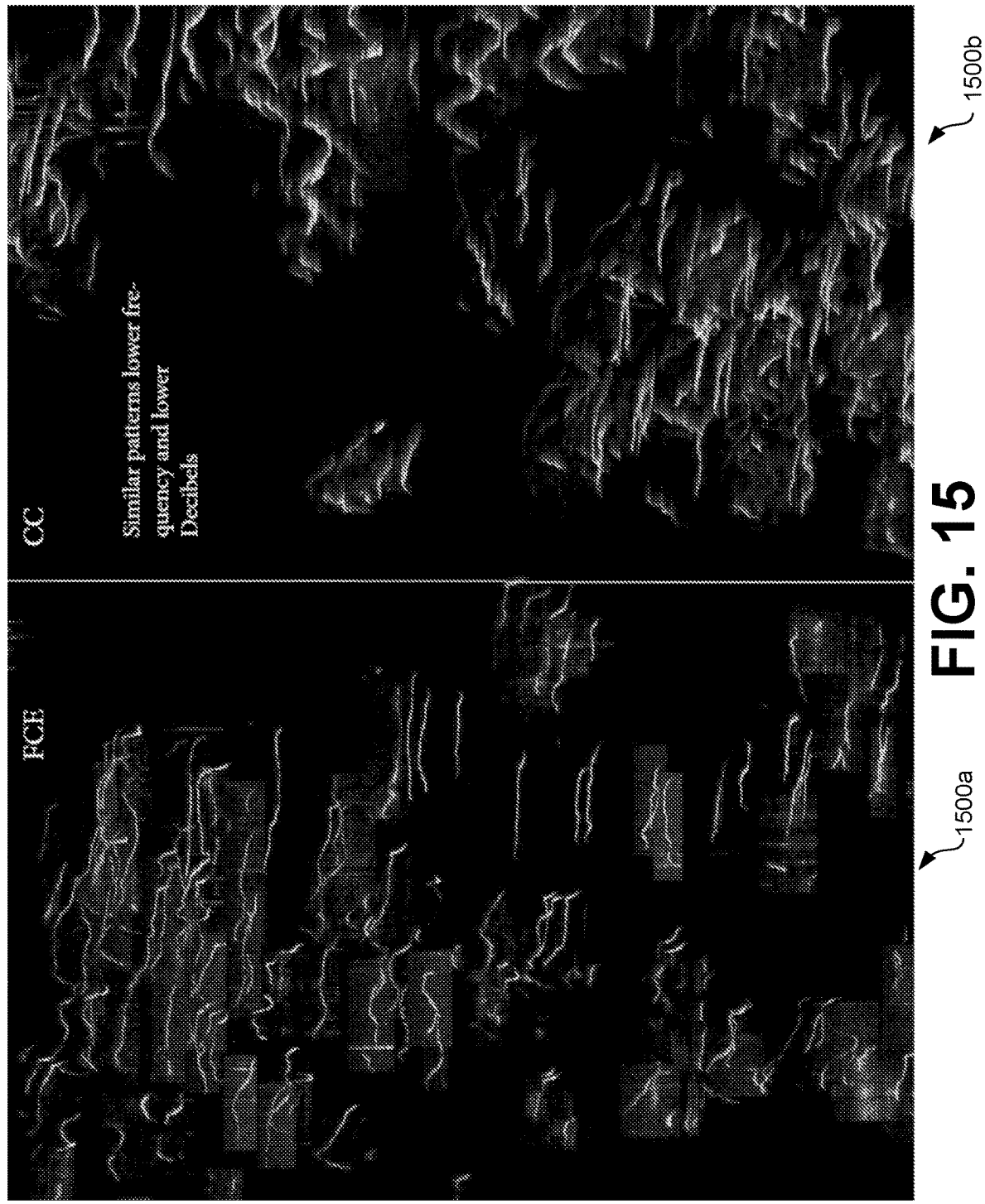

FIGS. 14 and 15 show example spectrograms 1400a, 1400b, 1500a, 1500b, and groupings of different MUSV according to various embodiments of the present disclosure. Observations: Analysis showed that the MUSV were significantly different between the (WI) collection and the (CC) and FCE) collection. Most of the spectrograms in the (CC) and (FCE) collection were trailing downward. The Spectrograms in the (WI) collection varied and had some upward trailing spectrograms. When the spectrograms matched, they were observed in a different frequency and different sound decibel. This observation is encouraging and may lead to the goal of using MUSV as a tool to monitor the health and well-being of research animals such as mice or other rodents.

Figure 16:
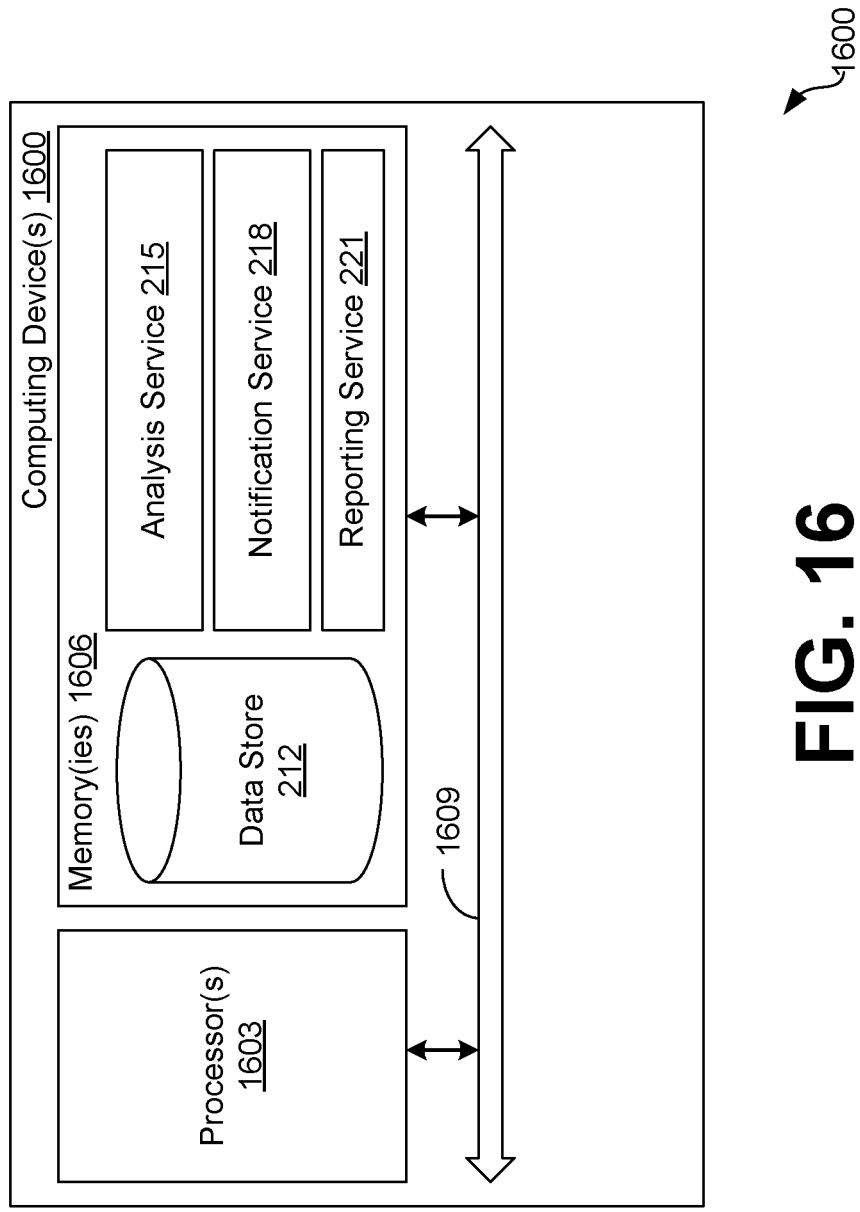
FIG. 16 is a schematic block diagram that provides one example illustration of a computing environment employed in the system and networked environment of FIG. 2 according to various embodiments of the present disclosure.

With reference to FIG. 16, shown is a schematic block diagram of a computing device 1600 that can be used to implement the system 200 of FIG. 2 according to various embodiments of the present disclosure. The computing device 1600 includes at least one processor circuit, for example, having a processor 1603 and a memory 1606, both of which are coupled to a local interface 1609. To this end, the computing device 1600 may comprise, for example, at least one server computer or like device. The local interface 1609 may comprise, for example, a data bus with an accompanying address/control bus or other bus structure as can be appreciated.

The computing device 1600 may include an input/output device such as a display 236 (as depicted in FIG. 2). The input/output device may comprise, for example, one or more devices such as a keyboard, computer mouse, gesture input device, touch screen (resistive, capacitive, or inductive), microphone, liquid crystal display (LCD) display, gas plasma-based flat panel display, organic light emitting diode (OLED) display, projector, or other types of input/output device, etc.

Stored in the memory 1606 are both data and several components that are executable by the processor 1603. In particular, stored in the memory 1606 and executable by the processor 1603 may be an analysis service 215, a notification service 218, a reporting service 221, and/or other applications. Also stored in the memory 1606 may be a data store 212 and other data. The computing device 1600 can also include one or more converter(s) to interface with input devices such as the sensor array 106 depicted in FIG. 2.

It is understood that there may be other applications that are stored in the memory 1606 and are executable by the processor 1603 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Delphi®, Flash®, or other programming languages.

A number of software components are stored in the memory 1606 and are executable by the processor 1603. In this respect, the term "executable" means a program file that is in a form that can ultimately be run by the processor 1603. Examples of executable programs may be, for example, a compiled program that can be translated into machine code in a format that can be loaded into a random access portion of the memory 1606 and run by the processor 1603, source code that may be expressed in proper format such as object code that is capable of being loaded into a random access portion of the memory 1606 and executed by the processor 1603, or source code that may be interpreted by another executable program to generate instructions in a random access portion of the memory 1606 to be executed by the processor 1603, etc. An executable program may be stored in any portion or component of the memory 1606 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 1606 is defined herein as including both volatile and nonvolatile memory and data storage components. Volatile components are those that do not retain data values upon loss of power. Nonvolatile components are those that retain data upon a loss of power. Thus, the memory 1606 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 1603 may represent multiple processors 1603 and the memory 1606 may represent multiple memories 1606 that operate in parallel processing circuits, respectively. In such a case, the local interface 1609 may be an appropriate network that facilitates communication between any two of the multiple processors 1603, between any processor 1603 and any of the memories 1606, or between any two of the memories 1606, etc. The local interface 1609 may comprise additional systems designed to coordinate this communication, including, for example, performing load balancing. The processor 1603 may be of electrical or of some other available construction.

Figure 17:
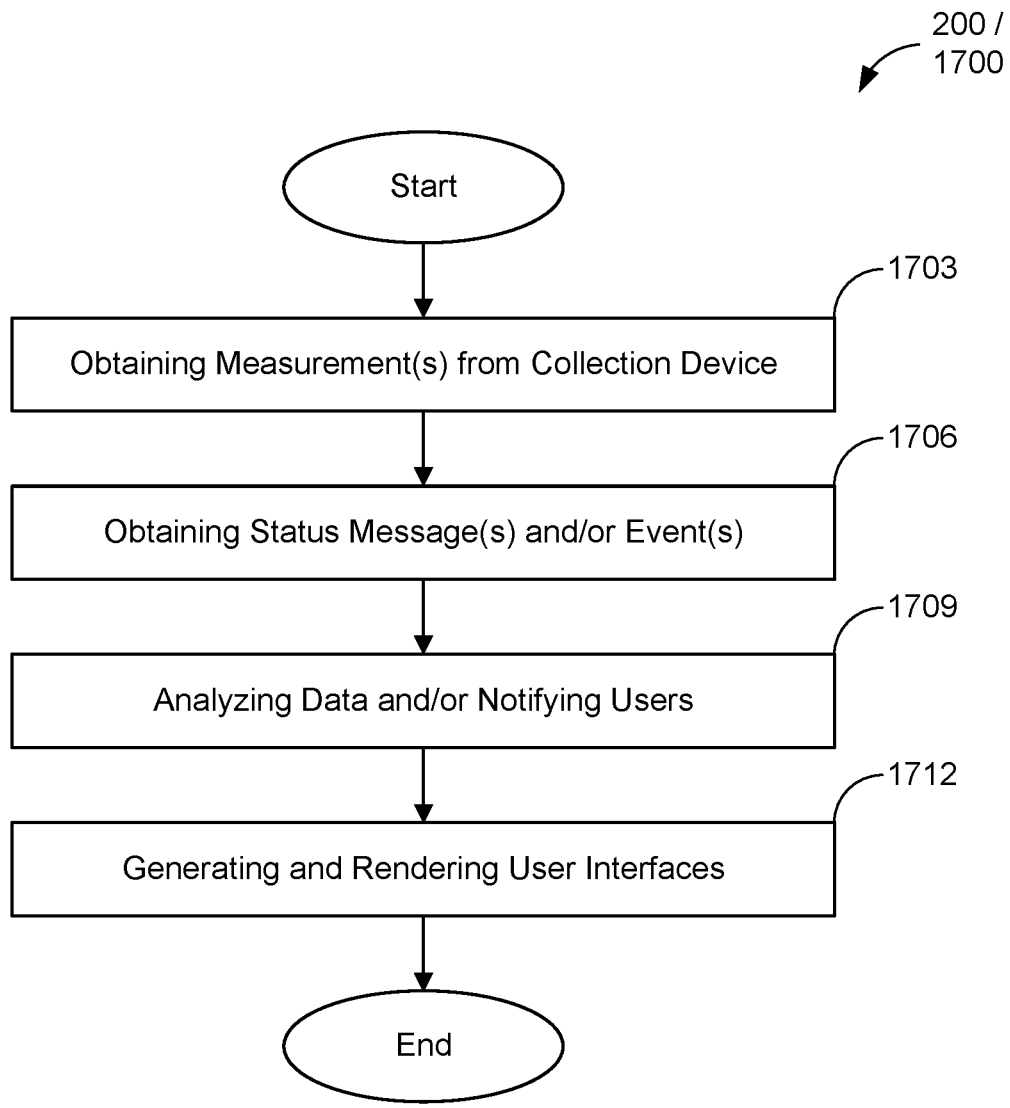
FIG. 17 is a flowchart illustrating one example of functionality implemented as portions of an application executed in a computing device in the system and networked environment of FIG. 2 according to various embodiments of the present disclosure.

Referring next to FIG. 17, shown is a flowchart that provides one example of the operation of a portion of the system 200 according to various embodiments. It is understood that the flowchart of FIG. 17 provides merely an example of the many different types of functional arrangements that may be employed to implement the operation of the portion of the system 200 as described herein. As an alternative, the flowchart of FIG. 3 may be viewed as depicting an example of elements of a method 1700 implemented in the system 200 (FIG. 2) according to one or more embodiments.

Beginning with box 1703, a computing device (e.g., computing device 1600 as shown in FIG. 16) of the computing environment 203 of the system 200 can obtain measurements 227 or other data collected by the collection device 103. At box 1706, the computing device can obtain the status messages 230 or events 233 generated by the collection device 103. At box 1709, the computing device can execute the analysis service 215 to perform data analytics and apply modern data science, and machine learning (ML) techniques to the data in the data store 212. The computing device can also execute the notification service 218 to create alerts and other notifications for the operations for the animal facility (e.g., staff), Principal Investigator (PI), or other users of the system 200. At box 1712, the computing device can execute the reporting service 221 to generate user interfaces 242 (FIG. 2) for rendering by the client application 239 (FIG. 2) on the clients 206 (FIG. 6). Thereafter, the process can proceed to completion.

Although the analysis service 215, notification service 218, reporting service 221, micro-environment monitor 115, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

Although the flowcharts of FIGS. 3 and 17 shows a specific order of execution, it is understood that the order of execution may differ from that which is depicted. For example, the order of execution of two or more blocks may be scrambled relative to the order shown. Also, two or more blocks shown in succession in FIG. 3 or 17 may be executed concurrently or with partial concurrence. Further, in some embodiments, one or more of the blocks shown in FIGS. 3 and 17 may be skipped or omitted (in favor, e.g., conventional approaches). In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the analysis service 215, notification service 218, and reporting service 221, and/or micro-environment monitor 115 that comprises software or code can be embodied in any non-transitory computer-readable medium for use by or in connection with an instruction execution system such as, for example, a processor 1603 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

In addition to the foregoing, the various embodiments of the present disclosure include, but are not limited to, the embodiments set forth in the following clauses:

Clause 1. A collection device, comprising a sensor array configured to sense a micro-environment of a cage; and a micro-environment monitor, comprising a network interface; at least one processor; and program instructions stored in memory and executable by the at least one processor that, when executed, cause the micro-environment monitor to send data to a computing environment using the network interface, the data based at least in part on at least one of audio content captured by the sensor array, or a measurement provided by the sensor array.

Clause 2. The collection device according to clause 1, further comprising at least one bracket adapted to removably mount at least a portion of the collection device to the cage.

Clause 3. The collection device according to clause 1 or 2, further comprising a fastener element adapted to selectively engage with at least a portion of the cage to secure the sensor array to the at least the portion of the cage.

Clause 4. The collection device according to any of clauses 1-3, wherein the network interface comprises a transceiver.

Clause 5. The collection device according to any of clauses 1-4, wherein the data comprises a status message concerning a presence of a rodent in the cage, the status message comprising at least one of no abnormal events detected, no rodent detected, a flooded cage event, a presence of mouse pups event, a presence of aggressive fighting event, a presence of injury event, a presence of chronic pain event, or a presence of mating event.

Clause 6. The collection device according to any of clauses 1-5, the program instructions further causing the micro-environment monitor to obtain the at least one of the audio content captured by the sensor array, or the measurement provided by the sensor array.

Clause 7. The collection device according to any of clauses 1-6, the program instructions further causing the micro-environment monitor to process the audio content to determine that audible or ultrasonic vocalizations of a rodent are present.

Clause 8. The collection device according to any of clauses 1-7, wherein the sensor array comprises a first sensor configured to capture the audio content corresponding with audible or ultrasonic vocalizations of a rodent in the cage; and a second sensor comprising at least one of a position sensor, a temperature sensor, a humidity sensor, a light sensor, or a motion sensor.

Clause 9. A system, comprising a sensor array comprising a plurality of sensors, a first sensor of the plurality of sensors configured to capture audio content corresponding to audible or ultrasonic vocalizations of a rodent in a cage; and a micro-environment monitor, comprising a network interface; at least one processor; and program instructions stored in memory and executable by the at least one processor that, when executed, cause the micro-environment monitor to send a status message concerning the rodent in the cage to a computing environment with the network interface.

Clause 10. The system according to clause 9, wherein the program instructions further cause the micro-environment monitor to send data to the computing environment on an intermittent basis.

Clause 11. The system according to clause 9 or 10, wherein the plurality of sensors further comprises a second sensor comprising at least one of a position sensor, a temperature sensor, a humidity sensor, a light sensor, or a motion sensor; and the data is based at least in part on a measurement provided by the second sensor.

Clause 12. The system according to any of clauses 9-11, wherein the program instructions further cause the micro-environment monitor to obtain at least one of the audio content captured by the first sensor, or a temperature, a humidity, a light intensity, a light density, or a rodent occupant motion associated with the cage observed by the second sensor.

Clause 13. The system according to any of clauses 9-12, wherein the status message comprises at least one of no abnormal events detected, no rodent detected, a flooded cage event, a presence of mouse pups event, a presence of aggressive fighting event, a presence of injury event, a presence of chronic pain event, or a presence of mating event.

Clause 14. The system according to any of clauses 9-13, wherein the program instructions further cause the micro-environment monitor to process the audio content to determine that audible or ultrasonic vocalizations of the rodent are present.

Clause 15. A method, comprising monitoring a cage with a sensor array comprising a plurality of sensors, a first one of the sensors configured to capture audio content comprising audible or ultrasonic vocalizations of an animal in the cage; and sending a status message concerning the animal to a computing environment on an intermittent basis.

Clause 16. The method according to clause 15, wherein the animal comprises a mouse or other rodent.

Clause 17. The method according to clause 15 or 16, wherein the status message comprises at least one of no abnormal events detected, no rodent detected, a flooded cage event, a presence of mouse pups event, a presence of aggressive fighting event, a presence of injury event, a presence of chronic pain event, or a presence of mating event.

Clause 18. The method according to any of clauses 15-17, the method further comprising processing the audio content to determine a classification of the audible or ultrasonic vocalizations of the animal.

Clause 19. The method according to any of clauses 15-18, wherein the status message is based at least in part on the classification of the audible or ultrasonic vocalizations of the animal.

Clause 20. The method according to any of clauses 15-18, wherein the plurality of sensors further comprises a second sensor comprising at least one of a position sensor, a temperature sensor, a humidity sensor, a light sensor, or a motion sensor; and the status message is further based at least in part on a measurement provided by the second sensor.

Although embodiments have been described herein in detail, the descriptions are by way of example. The features of the embodiments described herein are representative and, in alternative embodiments, certain features and elements may be added or omitted. Additionally, modifications to aspects of the embodiments described herein may be made by those skilled in the art without departing from the spirit and scope of the present disclosure defined in the following claims, the scope of which are to be accorded the broadest interpretation so as to encompass modifications and equivalent structures.

Therefore, at least the following is claimed:

1. A collection device system, comprising:
a sensor array configured to sense a micro-environment of a cage, the sensor array being secured to at least a first portion of the cage by a fastener element;
at least one adjustable bracket adapted to removably mount at least a portion of a housing for a micro-environment monitor of the collection device to a second portion of the cage;
a neural network model trained to classify audio content captured by the sensor array or measurements provided by the sensor array;
the micro-environment monitor, comprising:
a network interface;
at least one processor; and
program instructions stored in memory and executable by the at least one processor that, when executed, cause the micro-environment monitor to at least:
process, by applying the neural network model to generate a classification, the at least one of the audio content captured by the sensor array or the measurements provided by the sensor array; and
send the classification to a computing environment using the network interface; and
the computing environment comprising a server computer that is communicatively coupled to a plurality of micro-environment monitors for a plurality of cages, wherein the plurality of cages includes the cage and the plurality of micro-environment monitors include the micro-environment monitor, wherein the server computer is configured to receive and analyze a plurality of classifications from the plurality of micro-environment monitors and detect an anomaly that exists for the cage when compared to other cages of the plurality of cages.

2. The collection device system of claim 1, wherein the network interface comprises a transceiver.

3. The collection device system of claim 1, the program instructions further causing the micro-environment monitor to obtain the at least one of: the audio content captured by the sensor array, or the measurements provided by the sensor array.

4. The collection device system of claim 3, wherein the classification identifies that audible or ultrasonic vocalizations of a rodent are present.

5. The collection device system of claim 1, wherein the sensor array comprises:
a first sensor configured to capture the audio content corresponding with audible or ultrasonic vocalizations of a rodent in the cage; and a second sensor comprising at least one of: a position sensor, a temperature sensor, a humidity sensor, a light sensor, or a motion sensor,
wherein the server computer is further configured to detect when measurement data obtained from the second sensor is threatening to stray outside set parameters.

6. A system, comprising:
a sensor array comprising a plurality of sensors, a first sensor of the plurality of sensors configured to capture audio content corresponding to audible or ultrasonic vocalizations of a rodent in a cage, the sensor array being secured to the cage;
a neural network model trained to classify audio content captured by the sensor array;
a micro-environment monitor mounted to the cage, comprising:
a network interface;
at least one processor; and
program instructions stored in memory and executable by the at least one processor that, when executed, cause the micro-environment monitor to at least:
process, by applying the neural network model to generate an audio classification, the audio content captured by the sensor array; and
send a status message concerning the rodent in the cage to a computing environment with the network interface, the status message comprising the audio classification; and
the computing environment comprising a server computer that is communicatively coupled to a plurality of micro-environment monitors for a plurality of cages, wherein the plurality of cages includes the cage and the plurality of micro-environment monitors include the micro-environment monitor, wherein the server computer is configured to receive and analyze a plurality of audio classifications from the plurality of micro-environment monitors and detect an anomaly that exists for the cage when compared to other cages of the plurality of cages.

7. The system of claim 6, wherein the program instructions further cause the micro-environment monitor to send data to the computing environment on an intermittent basis.

8. The system of claim 7, wherein the plurality of sensors further comprises a second sensor comprising at least one of: a position sensor, a temperature sensor, a humidity sensor, a light sensor, or a motion sensor; and the data is based at least in part on a measurement provided by the second sensor, wherein the server computer is further configured to detect when measurement data obtained from the second sensor is threatening to stray outside set parameters.

9. The system of claim 8, wherein the program instructions further cause the micro-environment monitor to obtain at least one of: the audio content captured by the first sensor, or a temperature, a humidity, a light intensity, a light density, or a rodent occupant motion associated with the cage observed by the second sensor.

10. The system of claim 6, wherein the audio classification indicates at least one of: no abnormal events detected, no rodent detected, a flooded cage event, a presence of mouse pups event, a presence of aggressive fighting event, a presence of injury event, a presence of chronic pain event, or a presence of mating event.

11. The system of claim 6, wherein the audio classification identifies that audible or ultrasonic vocalizations of the rodent are present.

12. A method, comprising:
communicatively coupling a plurality of micro-environment monitors for a plurality of cages to a computing environment, wherein the computing environment comprises a server computer,
monitoring a cage with a sensor array comprising a plurality of sensors, the sensor array being removably mounted, by a fastener element, to an inside portion of the cage, a first one of the sensors configured to capture audio content comprising audible or ultrasonic vocalizations of an animal in the cage, wherein the plurality of cages includes the cage;
processing, by applying a neural network model to generate an audio classification, the audio content captured by the sensor array, the neural network model having been trained to classify audio content captured by the sensor array;
sending, by a micro-environment monitor of the cage, a status message concerning the animal to a computing environment on an intermittent basis, the micro-environment monitor being removably mounted, by at least one adjustable bracket, to an outside portion of the cage, the status message comprising the audio classification, wherein the plurality of micro-environment monitors include the micro-environment monitor; and
receiving and analyzing, by the server computer, a plurality of audio classifications from the plurality of micro-environment monitors and detecting an anomaly that exists for the cage when compared to other cages of the plurality of cages.

13. The method of claim 12, wherein the animal comprises a mouse or other rodent.

14. The method of claim 12, wherein the audio classification indicates at least one of: no abnormal events detected, no rodent detected, a flooded cage event, a presence of mouse pups event, a presence of aggressive fighting event, a presence of injury event, a presence of chronic pain event, or a presence of mating event.

15. The method of claim 12, wherein the audio classification identifies that the audible or ultrasonic vocalizations of the animal are present.

16. The method of claim 15, wherein the status message is based at least in part on the audio classification that identifies the audible or ultrasonic vocalizations of the animal.

17. The method of claim 12, wherein the plurality of sensors further comprises a second sensor comprising at least one of: a position sensor, a temperature sensor, a humidity sensor, a light sensor, or a motion sensor; and the status message is further based at least in part on a measurement provided by the second sensor, wherein the method further comprises detecting, by the server computer, when measurement data obtained from the second sensor is threatening to stray outside set parameters.

18. The collection device system of claim 1, wherein the program instructions further cause the micro-environment monitor to send data to the computing environment on an intermittent basis.

19. The collection device system of claim 1, wherein the first portion of the cage is an interior side of a lid of the cage, the lid of the cage at least partially enclosing the cage.

20. The collection device system of claim 1, wherein the measurements comprise lighting information, temperature information, and humidity information.

* * * * *